US012618678B2

(12) United States Patent
Ren et al.

(10) Patent No.: US 12,618,678 B2
(45) Date of Patent: May 5, 2026

---

(54) SMARTPHONE-BASED INERTIAL ODOMETRY

(71) Applicant: The Regents of the University of California, Oakland, CA (US)

(72) Inventors: Peng Ren, Santa Cruz, CA (US); Fatemeh Elyasi, Santa Cruz, CA (US); Roberto Manduchi, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/567,490

(22) PCT Filed: Jun. 13, 2022

(86) PCT No.: PCT/US2022/033245
§ 371 (c)(1),
(2) Date: Dec. 6, 2023

(87) PCT Pub. No.: WO2022/261539
PCT Pub. Date: Dec. 15, 2022

(65) Prior Publication Data
US 2024/0271938 A1 Aug. 15, 2024

Related U.S. Application Data

(60) Provisional application No. 63/339,778, filed on May 9, 2022, provisional application No. 63/209,853, filed on Jun. 11, 2021.

(51) Int. Cl.
*G01C 21/16* (2006.01)
*G01C 22/00* (2006.01)
(Continued)

(52) U.S. Cl.
CPC ............. *G01C 21/16* (2013.01); *G06N 3/044* (2023.01); *G06N 3/08* (2013.01)

(58) Field of Classification Search
CPC ........ G01C 21/16; G01C 22/00; G06N 3/044; G06N 3/08
(Continued)

(56) References Cited

U.S. PATENT DOCUMENTS

| | | | | |
|---|---|---|---|---|
| 2015/0308839 | A1* | 10/2015 | Jiang ..................... | G01C 21/383 702/5 |
| 2017/0219359 | A1* | 8/2017 | Elhoushi ................. | G01S 19/01 |

(Continued)

OTHER PUBLICATIONS

Chen. "IONet: Learning to Cure the Curse of Drift in Inertial Odometry" 6468-6476. The Thirty-Second AAAI Conference on Artificial intelligence (AAAI-18). Web. 2018; pp. 6468-6476.
(Continued)

*Primary Examiner* — Tyler D Paige
(74) *Attorney, Agent, or Firm* — GATES & COOPER LLP

(57) ABSTRACT

A computer implemented system useful for determining turns in a user's trajectory, including one or more processors; one or more memories; and one or more programs stored in the one or more memories, wherein the one or more programs executed by the one or more processors (1) receive input data, comprising orientation data and acceleration from one or more sensors carried by a user taking steps along a trajectory; (2) analyze the input data using a first trained machine learning algorithm so as to detect a plurality of n straight sections when the user is walking along an approximately straight path; (3) comprise an orientation tracker tracking an orientation of the user in each of the n straight sections, wherein the orientation comprises an estimated orientation taking into account drift of the input data outputted from the one or more sensors; and (4) comprise a
(Continued)

turn detector detecting each of the turns, wherein each of the turns is a change in the estimated orientation of the user in the n$^{th}$ straight section as compared to the estimated orientation in the (n−1)$^{th}$ straight section.

20 Claims, 25 Drawing Sheets

(51) Int. Cl.
  G06N 3/044      (2023.01)
  G06N 3/08      (2023.01)
(58) Field of Classification Search
  USPC .......................................................... 701/500
  See application file for complete search history.

(56) References Cited

U.S. PATENT DOCUMENTS

| | | | |
|---|---|---|---|
| 2019/0128673 A1* | 5/2019 | Faragher | G01C 21/1652 |
| 2023/0266140 A1* | 8/2023 | Camu | G01C 21/3652 |
| | | | 701/519 |
| 2024/0271938 A1* | 8/2024 | Ren | G06N 3/044 |

OTHER PUBLICATIONS

PCT International Search Report and Written Opinion dated Oct. 26, 2022 for PCT Application No. PCT/US22/33245.
Ren. "Smartphone-Based Inertial Odometry for Blind Walkers" 1-23. Sensors. Web. Jun. 11, 2021; pp. 1-23.
Flores. "WeAllWalk: An Annotated Data Set of Inertial Sensor Time Series from Blind Walkers" 1-28. ACM Trans. Access. Comput.. Web. Nov. 2017; vol. 9, Article 1, pp. 1:1-1:28.
Edel et al., "An Advanced Method for Pedestrian Dead Reckoning Using BLSTM-RNNs". In Proceedings of the 2015 International Conference on Indoor Positioning and Indoor Navigation (IPIN), Banff, AB, Canada, Oct. 13-16, 2015; pp. 1-6.
Fallah et al., "The User as a Sensor: Navigating Users with Visual Impairments in Indoor Spaces Using Tactile Landmark"s. In Proceedings of the SIGCHI Conference on Human Factors in Computing Systems, Austin TX, USA, May 5- 10, 2012; pp. 425-432.
Flores et al., "An Annotated Dataset of Inertial Sensor Time Series from Blind Walkers". ACM Trans. Access. Comput. (TACCESS) 2018, 11, 1-28.
Flores et al., "Ariadne's Thread: Robust Turn Detection for Path Back-Tracing Using the IPhone". IEEE: 2014.
Flores et al., "Easy Return: An App for Indoor Backtracking Assistance". In Proceedings of the 2018 CHI Conference on Human Factors in Computing Systems, Montreal, QC, Canada, Apr. 21-26, 2018; pp. 1-12.
Guerreiro et al., "Airport Accessibility and Navigation Assistance for People with Visual Impairments". In Proceedings of the 2019 CHI Conference on Human Factors in Computing Systems, Glasgow, Scotland, UK, May 4-9, 2019; pp. 1-14.
Hsuan et al., "Finding Your Way Back: Comparing Path Odometry Algorithms for Assisted Return". In Proceedings of the 2021 IEEE International Conference on Pervasive Computing and Communications Workshops and Other Affiliated Events (PerCom Workshops), Kassel, Germany, Mar. 22-26, 2021.
Kang et al., "D.-S. Smartphone-Based Traveled Distance Estimation Using Individual Walking Patterns for Indoor Localization". Sensors 2018, 18, 3149.
Riehle et al., "Indoor Inertial Waypoint Navigation for the Blind". In Proceedings of the 2013 35th Annual International Conference of the IEEE Engineering in Medicine and Biology Society (EMBC), Osaka, Japan, Jul. 3-7, 2013; pp. 5187-5190.
Wang et al., "Pedestrian Stride-Length Estimation Based on LSTM and Denoising Autoencoders". Sensors 2019, 19, 840.
Yan et al., "Robust Neural Inertial Navigation in the Wild". Benchmark, Evaluations, and New Methods. arXiv arXiv:1905.12853 2019.
Yoshida et al., "Sampling Rate Dependency in Pedestrian Walking Speed Estimation Using DualCNN-LSTM". UbiComp/ISWC '19 Adjunct, Sep. 9-13, 2019, London, United Kingdom, pp. 862-868.

* cited by examiner

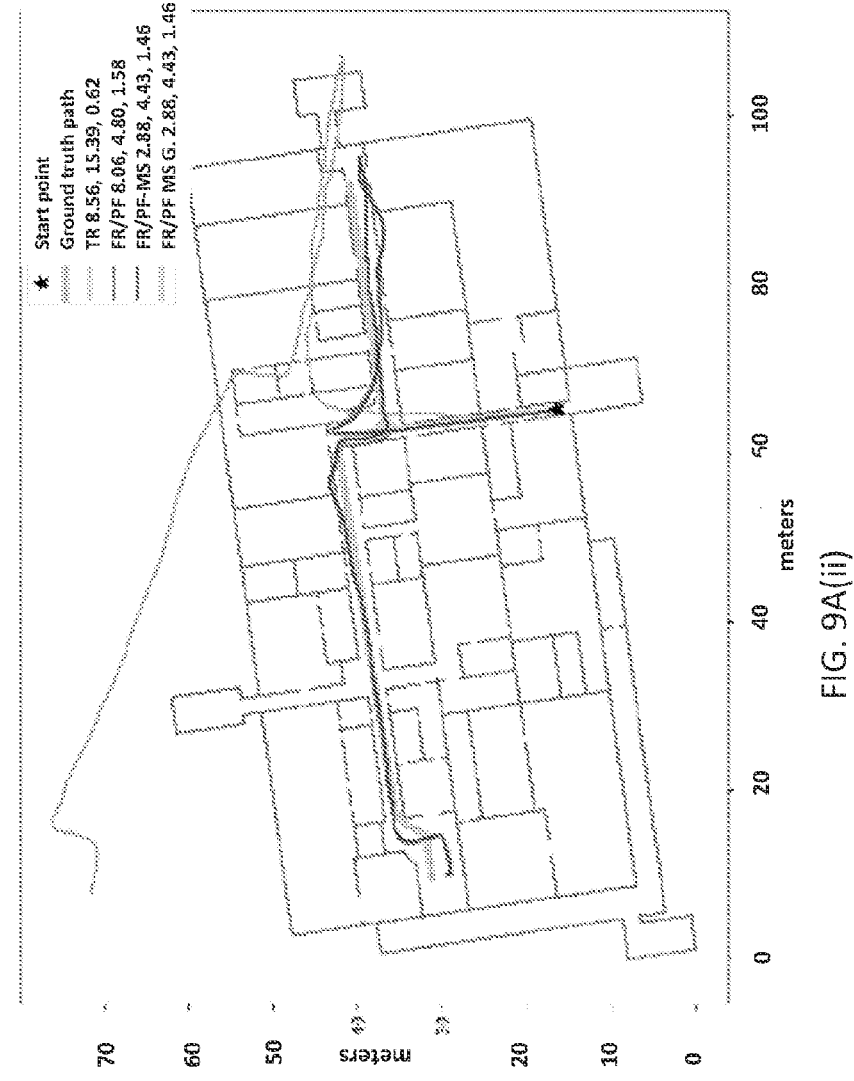
FIG. 9A(ii)

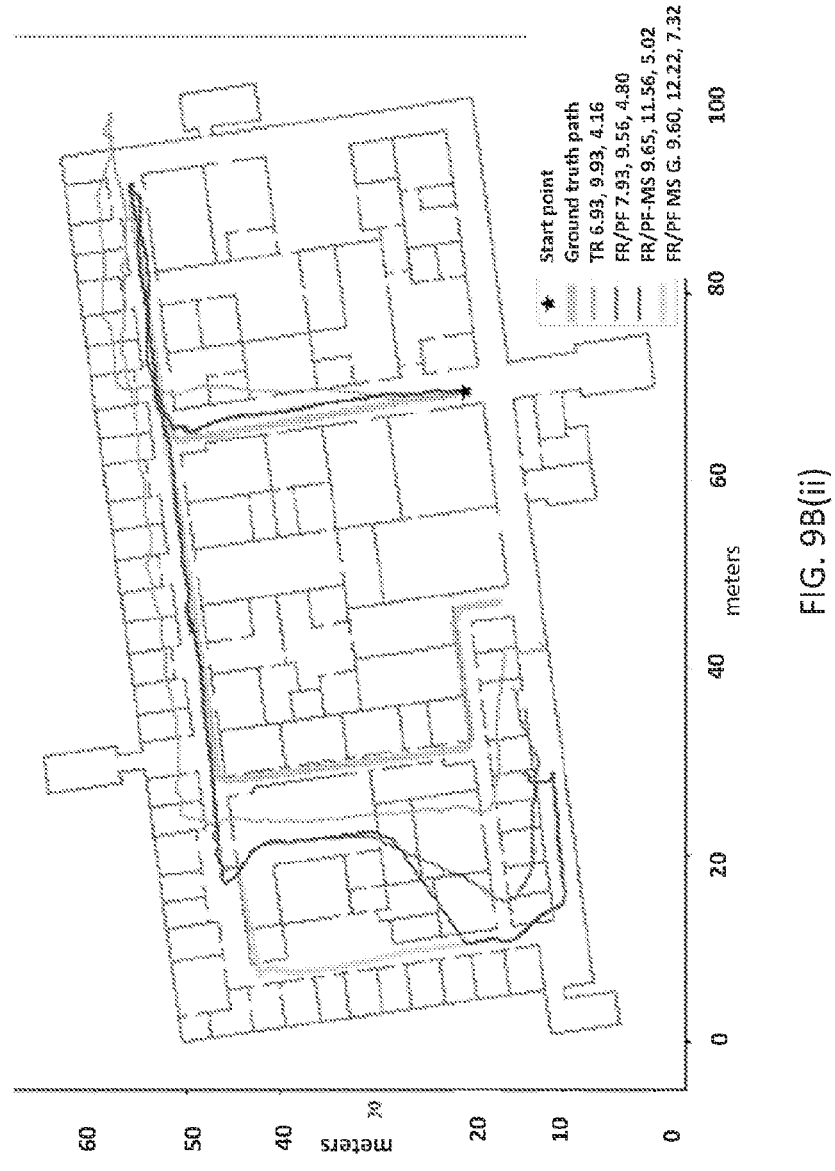
FIG. 9B(ii)

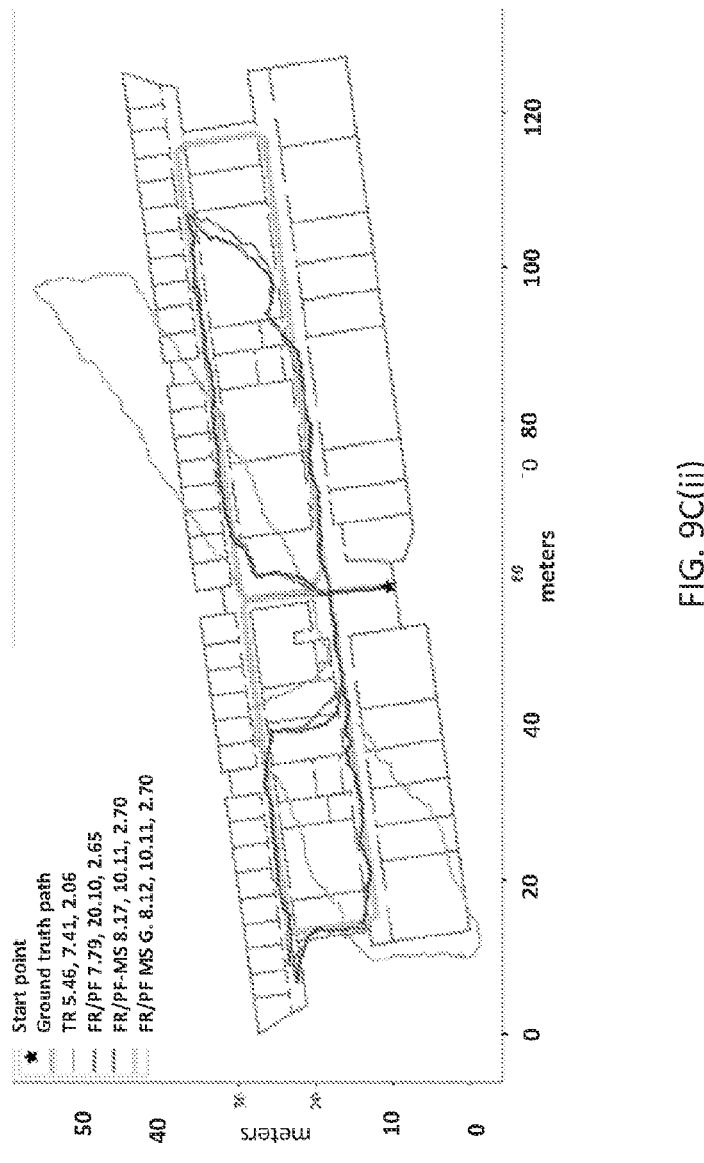
FIG. 9C(ii)

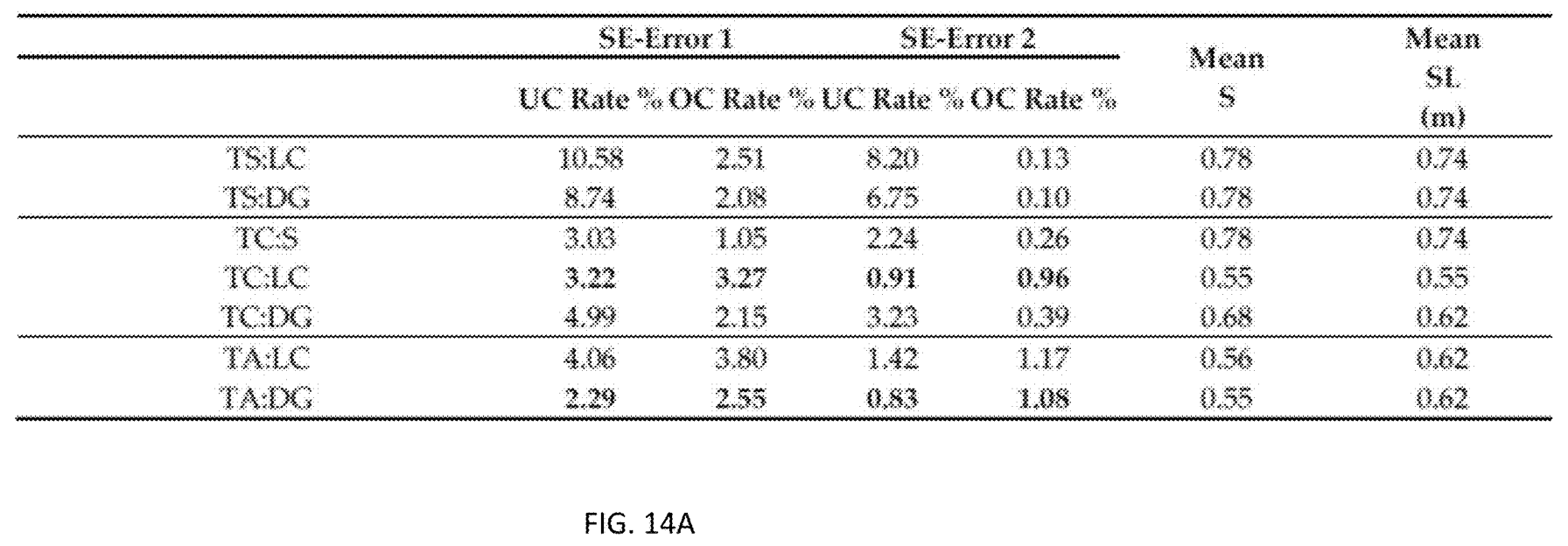

| | SE-Error 1 | | SE-Error 2 | | Mean S | Mean SL (m) |
|---|---|---|---|---|---|---|
| | UC Rate % | OC Rate % | UC Rate % | OC Rate % | | |
| TS:LC | 10.58 | 2.51 | 8.20 | 0.13 | 0.78 | 0.74 |
| TS:DG | 8.74 | 2.08 | 6.75 | 0.10 | 0.78 | 0.74 |
| TC:S | 3.03 | 1.05 | 2.24 | 0.26 | 0.78 | 0.74 |
| TC:LC | 3.22 | 3.27 | 0.91 | 0.96 | 0.55 | 0.55 |
| TC:DG | 4.99 | 2.15 | 3.23 | 0.39 | 0.68 | 0.62 |
| TA:LC | 4.08 | 3.80 | 1.42 | 1.17 | 0.56 | 0.62 |
| TA:DG | 2.29 | 2.55 | 0.83 | 1.08 | 0.55 | 0.62 |

FIG. 14A

| | 45° TD-Error | | 90° TD-Error | | |
| | UC Rate % | OC Rate % | UC Rate % | OC Rate % | |
|---|---|---|---|---|---|
| TS:LC | 0.64 | 6.85 | 0 | 1.87 | |
| TS:DG | 1.14 | 4.49 | 0.81 | 0.81 | |
| TC:S | 0 | 0 | 0 | 0 | |
| TC:LC | 1.64 | 3.98 | 0.54 | 0.26 | |
| TC:DG | 1.11 | 4.30 | 0 | 0.79 | |
| TA:LC | 0.37 | 3.51 | 0 | 0.79 | |
| TA:DG | 1.15 | 5.39 | 0 | 0.83 | |

FIG. 14B

| | A/S | | | 45° T/S | | | 90° T/S | | | R | | | FR | | |
|---|---|---|---|---|---|---|---|---|---|---|---|---|---|---|---|
| TS:LC | 9.43 | 14.68 | 4.90 | 9.17 | 14.48 | 4.70 | 9.03 | 13.90 | 4.63 | 5.43 | 8.56 | 2.93 | -- | -- | -- |
| TS:DG | 5.81 | 8.97 | 3.30 | 5.64 | 8.67 | 2.82 | 4.94 | 7.50 | 2.75 | 5.66 | 8.55 | 2.84 | -- | -- | -- |
| TCS | 4.45 | 7.06 | 2.39 | 3.96 | 6.12 | 1.89 | 3.93 | 5.97 | 1.88 | 4.26 | 6.75 | 2.39 | -- | -- | -- |
| TC:LC | 3.85 | 6.21 | 2.30 | 3.86 | 6.45 | 2.22 | 3.46 | 5.47 | 1.97 | 5.43 | 8.56 | 2.93 | 4.36 | 7.37 | 2.54 |
| TC:DG | 6.38 | 9.90 | 3.29 | 6.28 | 9.86 | 2.92 | 6.13 | 9.60 | 2.92 | 5.66 | 8.55 | 2.84 | 6.80 | 10.42 | 3.29 |
| TA:LC | 6.29 | 10.27 | 3.60 | 5.99 | 9.79 | 3.32 | 5.88 | 9.47 | 3.31 | 5.43 | 8.56 | 2.93 | 6.18 | 9.90 | 3.27 |
| TA:DG | 5.21 | 8.37 | 2.88 | 5.00 | 8.18 | 2.52 | 4.59 | 7.64 | 2.50 | 5.66 | 8.55 | 2.84 | 5.17 | 8.08 | 2.50 |

SMARTPHONE-BASED INERTIAL ODOMETRY

CROSS REFERENCE TO RELATED APPLICATIONS

This application claims the benefit under 35 U.S.C. Section 119(e) of and commonly-assigned U.S. provisional patent application Ser. No. 63/209,853 filed Jun. 11, 2021 and U.S. provisional patent application Ser. No. 63/339,778 filed May 9, 2022, both applications by Peng Ren, Fatemeh Elyasi, and Roberto Manduchi, and both applications entitled "SMARTPHONE-BASED INERTIAL ODOMETRY," client reference 2021-594, both of which applications are incorporated by reference herein.

STATEMENT REGARDING FEDERALLY SPONSORED RESEARCH AND DEVELOPMENT

This invention was made with Government support under Grant No. R01 EY029260-01, awarded by the National Institutes of Health. The Government has certain rights in the invention.

BACKGROUND OF THE INVENTION

1. Field of the Invention

The present invention relates to inertial odometry.

2. Description of Related Art

Smartphone-based odometry systems for pedestrian tracking in indoor, GPS-denied environments have received considerable attention in recent years. These systems may help a person reach a gate in an airport [1] or a shop in a mall [2], navigate a museum [3], or find one's car in a parking lot [4]. Among the various approaches considered in the literature, technology based on inertial sensors have a number of practical advantages. For example, inertial-based odometry does not require the installation of infrastructure such as Bluetooth low energy (BLE) beacons [5]. In addition, no prior calibration ("fingerprinting") is necessary, unlike for systems based on Wi-Fi [6] or BLE beacons. Compared with systems that use a camera to determine the user's location (visual-based odometry [7]), and that, thus, require good un-occluded visibility of the scene, inertial systems are able to track the user even when they keep the phone in their pocket. The downside of this modality is that the user's location is tracked by integrating inertial data, which leads to possibly large errors due to accumulated drift. A number of strategies to deal with drift have been proposed, including zero-velocity updates [8], spatial constraints (e.g., Bayes filtering using a map of the environment [9]), and machine learning [10]. Multiple well-calibrated inertial datasets (containing data from accelerometer and gyros) collected from regular smartphones carried by human walkers have been made available in recent years [10-12].

Pedestrian Dead Reckoning (PDR)

Perhaps the simplest method to track the location of a walker is to count steps while measuring the user's orientation at all times [22-28]. Step counting is traditionally performed by finding peaks or other features in acceleration or rotation rate signals (e.g., [29-31]). More recently, recurrent neural networks (RNN) have been proposed as a robust alternative to "hand-crafted" algorithms [32-34].

The orientation of the phone can be obtained by proper integration of the data from the accelerometer and gyro [35, 36], but this typically results in accumulated drift. Turns can be detected, for example, by measuring short-time variations of the azimuth angle (or of the rotation rate from the gyro [37]), which are unaffected by slowly varying drift. Flores et al [38] proposed a system based on dynamic programming to estimate the discrete walker's orientation along with drift. Although effective in the tests of Flores et al [38] with sighted walkers, this algorithm gave poor results with blind walkers [16]. Another problem is how to decouple the orientation of the phone from the direction of walking. A number of algorithms for the estimation of the direction of walking, independently of the orientation of the phone, have been developed [39-42]. Another topic of interest is the robust detection of steps and of stride lengths, which are used as a proxy for the walker's velocity [29-31], [43-48]. When a map of the environment is available, it may provide a strong constraint for the space of possible trajectories. Bayes filtering (in particular, particle filtering [9]) is normally used in these situations [49-52].

Learning-Based Odometry

In recent years, a number of data-driven techniques for odometry, that rely less on models and more on machine learning, have emerged. For example, RIDI [11] regresses user velocity from the time series of linear accelerations and angular velocities. IONet [53] uses a deep neural network to compute user velocity and heading. RoNIN [10] processes inertial data in a heading-agnostic reference frame using a variety of deep network architectures. Importantly, RoNIN is able to decouple the phone's orientation from the user's orientation when walking. This means that tracking is unaffected by any possible repositioning of the phone (e.g., if the user moves the phone to a different pocket). A number of other learning-based algorithms for computing the walker's velocity, or for detecting steps and measuring stride lengths, have been recently proposed [33, 34, 54-61].

Inertial Navigation for Blind Travelers

Wayfinding systems for blind individuals have received special attention, given the potential of this technology to enable independent travel. Although GPS can be used for localization outdoors, indoor environments (office buildings, shopping malls, transit hubs) can be particularly daunting for blind travelers. By tracking the location of the blind walker, a wayfinding system can provide turn-by-turn directions, present location-based information (e.g., announce the presence of a store nearby), or help users re-trace their path from the starting point. Several wayfinding techniques specifically designed for blind travelers [62] have been considered, including visual odometry (e.g., [63, 64]), BLE beacon-assisted navigation [65], and magnetic navigation [66]. Although inertial data are often used to integrate information from other sensors, relatively little research work has explored the use of inertial sensors alone for blind navigation. This includes work by Fallah et al. [67] and Riehle et al. [68]. Flores and Manduchi [18] proposed an inertial system for assisted return (backtracking) that used a turns or steps representation of indoor environments in a study with six blind participants.

Inertial Data Sets

Well-calibrated datasets are important for performance assessment of odometry algorithms, and are essential for the training of learning-based systems. RIDI [11] was built using a smartphone equipped with an RGBD camera, which enables complete pose (location+orientation) reconstruction at each time using Visual SLAM. OxIOD [12] is a data collection with four different phone placements. The walkers' location was tracked by a Vicon system. RoNIN [10] is a large dataset with inertial data collected from a smartphone. A different phone, equipped with an RGBD camera, was used for ground-truth walker pose estimation. More limited in scope, the dataset presented in [69] contains inertial data from a smartphone with time-stamped heel strike events and stride lengths, as computed by a foot-mounted inertial system.

However, these methods still suffer from drift in the orientation of the walker outputted by the gyro sensor (due to bias in the gyro data), an error that increases with time. This technical problem is exacerbated for blind walkers and also leads to biases in path length estimation. What is needed, then, are improved methods for accounting for orientation drift and correcting biases in path length estimation. The present disclosure satisfies this need.

SUMMARY OF THE INVENTION

The present disclosure reports on a method and system for tracking a pedestrian's trajectory using a combination of pedestrian dead reckoning, a two-stage algorithm for turn detection, and optional particle filtering. In one or more examples, the pedestrian dead reckoning comprises receiving input data (e.g. acceleration and gyroscopic data in 3 dimensions) from inertial sensors (e.g. an accelerometer and/or a gyroscope) in the user's smartphone; transforming coordinates of the input data into a heading agnostic reference frame to obtain heading agnostic data; and counting steps using a machine learning algorithm that associates impulses in the heading agnostic data with the steps. The two-stage algorithm for turn detection comprises (1) using a machine learning algorithm (e.g., a recurrent neural network) to robustly identify when a user is walking regularly along a straight path; and (2) finding the difference in user's orientation between the beginning of a "straight walking" segment, and the end of the prior straight walking segment. In one or more examples, orientation drift is tracked by a mixture Kalman filter so as to reduce or eliminate the effect of drift on the turn detection.

The tracking method and system can be customized for particular types of walkers (e.g., blind persons walking with the help of a long cane) and can be implemented with or without the assistance of a map of the pedestrian environment (including the interior of a building). In one or more map-less implementations, the pedestrian tracking is used for assisted return, providing spatial information and direction to a blind user who is backtracking their path. Moreover, blind walkers (especially those who do not use a dog guide) often tend to veer when attempting to walk on a straight line, and this unwanted veering may generate false turn detections. The use of the two-stage turn detection system, formed by the orientation tracker and a straight walking detector, has proved reliable in the face of such adversarial situations.

In other examples, a map of the environment in digital form can be used to provide turn-by-turn directions to the desired destination. In some map-assisted applications, the system is integrated with a particle filter enhanced with a module that finds the modes of the posterior state distribution (representing the user's location) with increased accuracy and uses these modes to construct the trajectory. In addition, a map provides a strong constraint on the reconstructed trajectory (e.g., the trajectory cannot go through a wall). Thus, the tracking system is particularly useful in indoor environments where GPS cannot be used.

In yet further examples, turn or segment path representation is used for navigating inside buildings with corridors that intersect at discrete turning angles at multiples of 450 or 90°. Besides providing a strong spatial prior which can be used to compensate for drift, this representation is particularly useful for the verbal description of a path. As an example, a path could be represented as "walk straight for 80 steps, then make a right turn, walk straight for 50 more steps, make a left turn, then after 40 steps you will reach your destination". It is important to note that for a turn or segment representation to be successful, turns must be detected robustly. The two stage algorithm for turn detection described herein satisfies this requirement.

The performance of the different mechanisms for path reconstruction (map-less and map-assisted), as well as of the step counter and our turn detector, is evaluated using data collected from blind walkers represented in the WeAllWalk dataset. This analysis was conducted using a variety of assessment metrics. The results highlight the importance of training these algorithms with data from the same community of users (e.g., blind walkers) these systems are designed for. The evaluation demonstrates that reducing the influence of orientation drift increases accuracy of the path reconstruction.

Further example pedestrian dead-reckoning (PDR) systems include using an RNN-based step counter, coupled with (possibly drift-corrupted) heading information as provided by the iPhone's sensors; and a more sophisticated system (RoNIN [10]), based on deep learning, that was shown to produce state-of-the-art results when tested with existing inertial datasets. Since RoNIN was trained with sighted walkers, we experimented with fine-tuning its network with data from blind walkers in WeAllWalk.

Illustrative examples of the inventive subject matter described herein include, but are not limited to, the following.

1. A navigation system determining turns in a user's trajectory, comprising:
   a smartphone comprising a display and one or more sensors and at least comprising or coupled to one or more processors; one or more memories; and one or more programs stored in the one or more memories, wherein the one or more programs executed by the one or more processors:
   receive input data, comprising orientation data and acceleration from the one or more sensors carried by a user taking steps along a trajectory;
   detecting a plurality of n straight sections in the trajectory, where n is an integer, each of the straight sections corresponding to the user walking along a substantially straight or linear path;
   generating and tracking an orientation of the user in each of the n straight sections, wherein the orientation comprises an estimated orientation taking into account drift of the input data outputted from the one or more sensors;
   detecting one or more turns in the trajectory, wherein each of the turns is a change in the estimated orientation of the user in the $n^{th}$ one of the straight sections as compared to the estimated orientation in the $(n-1)^{th}$ one of the straight section; and
   outputting to the display, a graphical representation of the trajectory generated using the one or more turns.

2. The system of example 1, wherein detecting the straight sections further comprises the one or more programs:

storing the input data in a database;

transforming the input data into trajectory detection data processable by a first machine learning module;

classifying the trajectory detection data as representing motion in one of the straight sections or in a non-straight section using the first machine learning module; and labelling one or more values of the trajectory detection data in a database as being associated with one of the straight sections or indicating the one of the straight sections on the graphical representation on the display if the one or more values are classified by the first machine learning module as being associated with the one of the straight sections.

3. The system of example 2, wherein the first machine learning module is trained using training data comprising at least WeAllWalk data, or the acceleration and the orientation of, pedestrians comprising blind or visually impaired persons walking using a walking aid.

4 The system of example 2, wherein the first machine learning module comprises a GRU neural network.

5. The system of example 2 wherein the first machine learning module comprises a recurrent neural network trained to identify, from the acceleration and the orientation data comprising an azimuthal angle, each of the straight sections comprising one or more time intervals during which the user walks regularly or substantially on a straight path.

6. The system of any of example 6, wherein the first machine learning module is trained to disregard changes in the orientation resulting from the user comprising a visually impaired user stopping and rotating their body to re-orient or swerving to avoid a perceived obstacle.

7. The system of example 1, further comprising detecting each of the straight sections after the one or more programs sample the orientation data for no more than 1 second.

8. The system of example 1, wherein the turn by an angle of 90° is tracked as two consecutive turns by 45°.

9. The system of example 1, wherein the one or more programs:

transform coordinates of the input data into a heading agnostic reference frame, to obtain heading agnostic data;

detect the steps as detected steps by associating impulses in the heading agnostic data with the heel strikes using a second machine learning module;

count a number of the detected steps by associating the steps with a stride length, so as to output step data;

determine the trajectory using the detected steps and the turns; and the trajectory comprises:

one or more step displacement vectors defined at each of the detected steps as having a length equal to the stride length and a direction comprising an azimuthal angle obtained from the input data; and one or more turn displacement vectors defined as having a length equal to the step stride and with the direction determined from the turns detected by the turn detector.

10. The system of example 10, further comprising the one or more programs:

transforming the heading agnostic data into trajectory detection data processable by the second machine learning module; and at least

6 classifying or recognizing one or more values of the trajectory detection data as being associated with steps using the second machine learning module, or counting the steps using the second machine learning module.

11. The system of example 10, wherein the second machine learning module is trained using reference trajectory data outputted from another machine learning module identifying the user's trajectory.

12. The system of example 10, wherein the second machine learning module comprises an LSTM neural network comprising no more than 2 layers and a hidden unit size of no more than 6.

13. The system of example 1, wherein the trajectory is determined without reference to a map of an environment in which the user is moving.

14. The system of example 1, wherein the one or more programs:

receive a map of an environment in which the user is moving, the map identifying one or more impenetrable walls, and determine the trajectory by comparing the trajectory to the map and eliminating one or more paths in the trajectory that traverse the impenetrable walls.

15. The system of example 14, wherein the one or more programs:

receive or obtaining velocity vectors of the user from the input data or another source;

generate posterior locations of the user from the velocity vectors using a particle filtering module; and generate a mean shift estimating locations of the user corresponding to the highest modes of the posterior locations; and generate the trajectory by linking pairs of the estimated locations that share the largest number of the modes.

16. A method for determining turns in a user's trajectory, comprising:

capturing input data, comprising orientation data and acceleration from one or more sensors carried by a user taking steps along a trajectory;

detecting a plurality of n straight sections in the trajectory, each of the straight sections corresponding to the user walking along a substantially straight path or a linear path;

generating and tracking an orientation of the user in each of the n straight sections, wherein the orientation comprises an estimated orientation taking into account drift of the input data outputted from the one or more sensors; and detecting one or more turns in the trajectory, wherein each of the turns is a change in the estimated orientation of the user in the $n^{th}$ straight section as compared to the estimated orientation in the $(n-1)^{th}$ straight section.

17. The method of example 15, further comprising:

storing the input data in a database on a computer;

transforming the input data into trajectory detection data processable by a first machine learning module;

classifying the trajectory detection data as representing motion in one of the straight sections or in a non-straight section using the first machine learning module; and at least labelling one or more values of the trajectory detection data in a database as being associated with one of the straight sections or indicating the one of the straight sections on the graphical representation on the display if the one or more values are classified by the first machine learning module as being associated with the one of the straight sections.

18. The method of example 17 further comprising training the first neural network module for detecting at least one of the straight sections or turns in a trajectory, comprising:

collecting a set of first pedestrian data, the first pedestrian data comprising orientation data and acceleration data for a walking pedestrian;

applying one or more transformations to the first pedestrian data including smoothing to create a modified set of pedestrian data;

creating a first training set from the modified set, comprising labelled straight walking sections and labeled non-straight walking sections; and training the first neural network module in a first stage using the first training set to identify the straight sections in the trajectory data using the orientation data and the acceleration data, the straight sections each corresponding to the user walking along the linear path.

19. The method of example 18, wherein the first training set comprises the modified set comprising data for the pedestrians comprising blind or visually impaired persons walking using a walking aid comprising at least one of a cane or a guide dog.

20. The method of example 19, wherein the first pedestrian data comprises a WeAllWalk data set.

21. The method of example 18, wherein:

the applying of the transformations comprises removing data, from the first pedestrian data, associated with a 45° turn or 90° turns associated with a 45° turn; and the training comprises training the first machine learning module in the first stage, or another machine learning module, to detect, identify, or classify the turns in the trajectory comprising 90° turns.

22. The method of example 18, wherein:

the applying the transformations comprises converting the first pedestrian data corresponding to 90° turns into two consecutive 45° e turns; and the training comprises training the first machine learning module or another machine learning module, to detect, identify, or classify the turns comprising the 45° turns.

23. The method of example 18, further comprising:

creating a second training set from the modified set, the second training set comprising orientation turns between adjacent ones of the straight sections;

training the first machine learning module in a second stage, or another machine learning module, to detect, classify, or identify the turns in the trajectory using the second training set, using the second training set.

24. The method of example 23, further comprising:

creating a third training set comprising ground truth turns obtained from a database comprising ground truth data associated with the trajectory;

training the first machine learning module in a third stage, or the another machine learning module using the ground truth turns, to detect, identify, or classify the turns in the trajectory using the third training set.

25. The method of example 18 further comprising training a second machine learning module for detecting steps in the trajectory, comprising:

collecting a set of second pedestrian data comprising the acceleration of the pedestrian in three orthogonal directions and a rotation rate of the smartphone in the three orthogonal directions, wherein the acceleration is associated with steps taken by the pedestrian along the trajectory;

applying one or more second transformations to the second pedestrian data, comprising transforming coordinates of the second pedestrian data into a heading agnostic reference frame, to obtain heading agnostic data;

creating a second training set from the heading agnostic data, wherein steps are associated with:

impulses identified using the acceleration data, the impulses corresponding to heel strikes of the walking pedestrian, in the heading agnostic data; and a stride length of the pedestrian; and training the second machine learning module using the second training set to at least identify or count a number of the steps in the trajectory by associating the steps with the impulses.

26. The method of example 25, further comprising:

creating a third training set comprising ground truth step data; and training the second machine learning module in a second stage to detect the steps using the third training set.

27. The method of example 25 further comprising training a third neural network module for mapping a trajectory, comprising:

collecting a set of third pedestrian data comprising the trajectory mapped using the first machine learning module and the second machine learning module;

creating a third training set comprising ground truth data comprising waypoint time stamps; and training the third machine learning module to determine or map the trajectory by comparing a degree of alignment of the trajectory (mapped using the first neural network and the second neural network) with a ground truth path passing through the waypoint time stamps.

BRIEF DESCRIPTION OF THE DRAWINGS

Referring now to the drawings in which like reference numbers represent corresponding parts throughout.

are shown as red dots, while the estimated walker's locations at waypoint timestamps $$(P^i(t^i_j))$$

are shown as blue dots. The distances $$\left\| \overline{P}^i_j - P^i(t^i_j) \right\|$$

are shown by white arrows. The uniform distance sampling of the segments joining consecutive waypoints $$(\{\overline{Q}^i_m\})$$

is shown by orange dots, while that of the estimated trajectory $$(\{Q^i_m\})$$

is shown by light blue dots. The associated distances $$\min_m (\|Q^i_m - \overline{Q}^i_n\|) \text{ and } \min_n (\|Q^i_m - \overline{Q}^i_n\|)$$

are shown with orange and light blue arrows, respectively.

Figure 8:
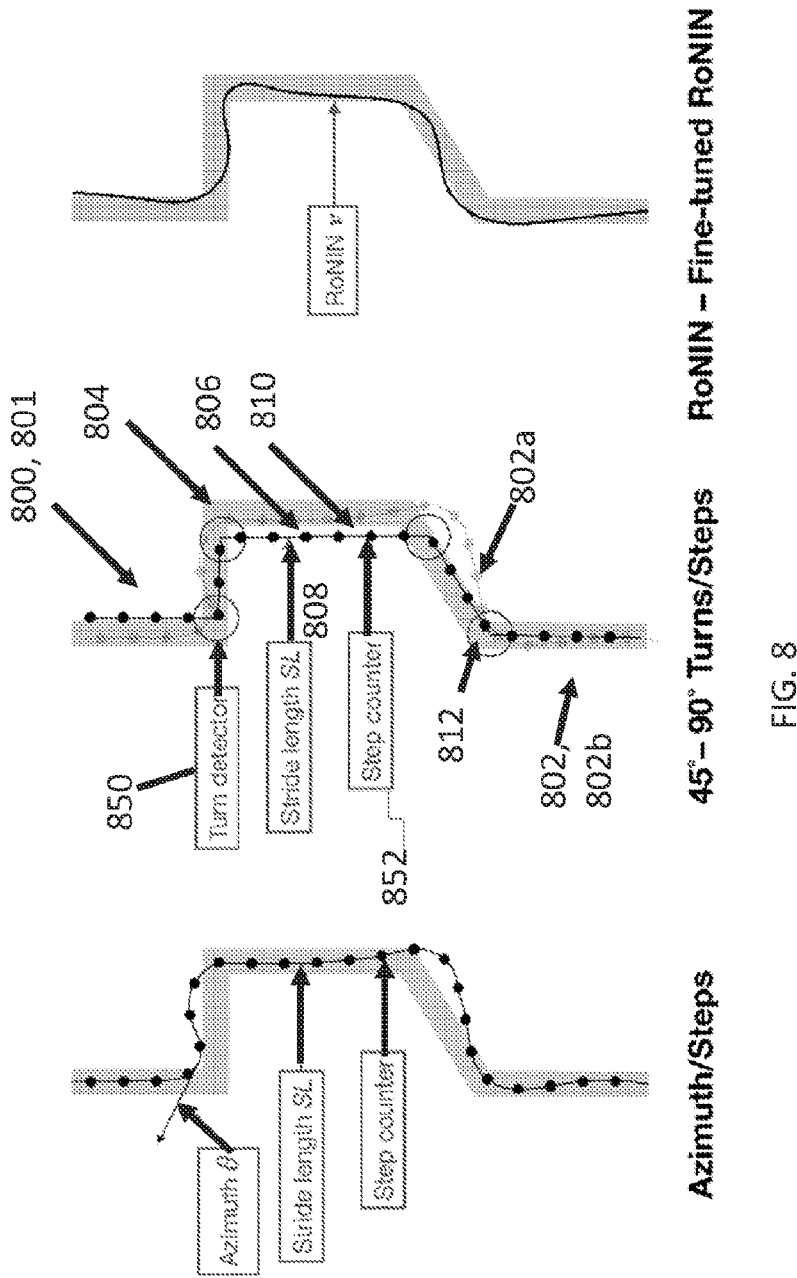

FIG. 8. Diagrammatic examples of the algorithms used for map-less path reconstruction. The blue line represents the path taken by the walker. The black line represents the estimated path. Dots represent heel strikes; circles represent turns.

Figure 9A:
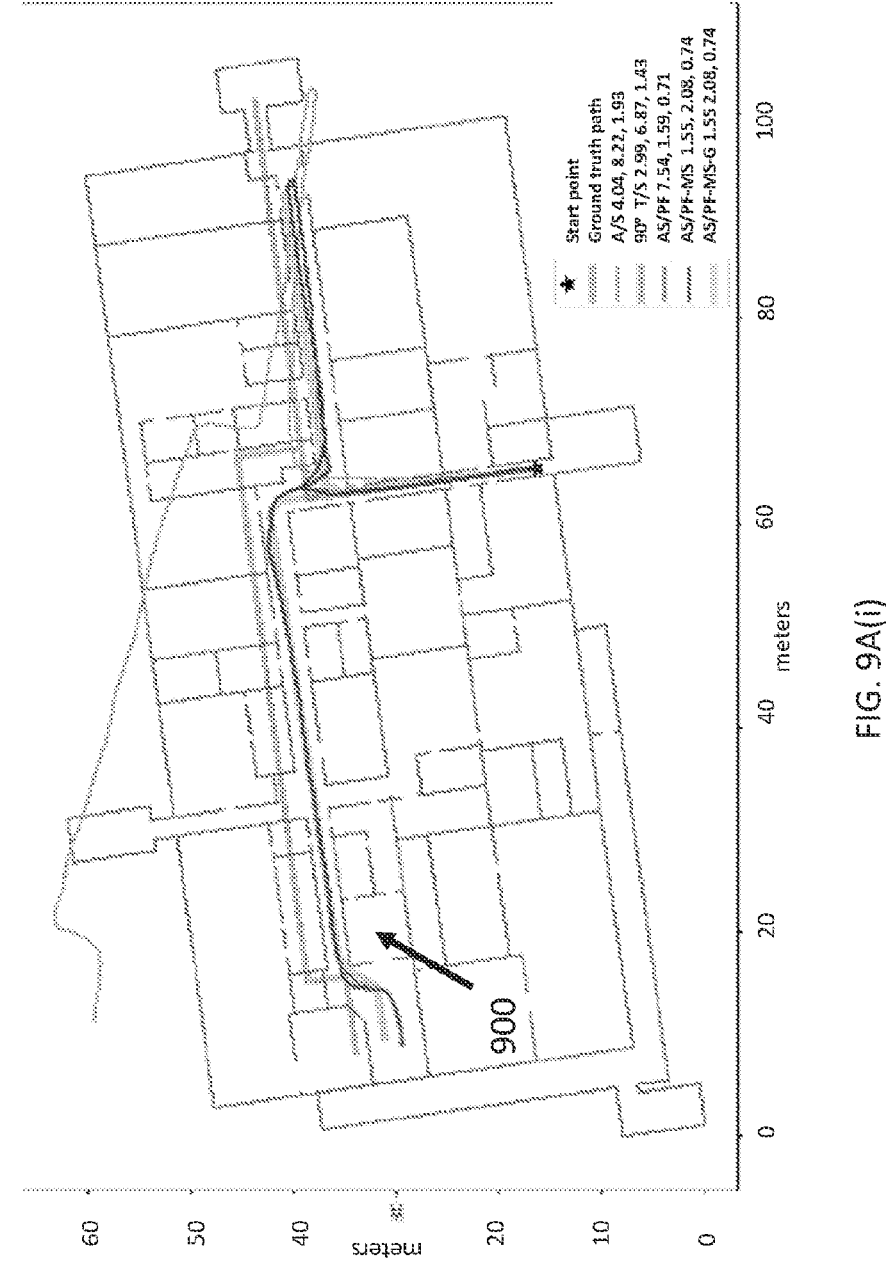

FIG. 9. Examples of path reconstruction from the TA:LC training/test modality. A,B,C(i): Map-less: A/S, 90° T/S; Map-assisted: A/S-PF, A/S-PF-MS, A/S-PF-MS-G. A,B,C (ii) Map-less: FR; Map-assisted: FR-PF, FR-PF-MS, FR-PF-MS-G. Reconstruction errors for the three metrics (RM-SEwp, Hauss, avHauss) are shown (in units of meters) in the legend of each Figure.

Figure 10:
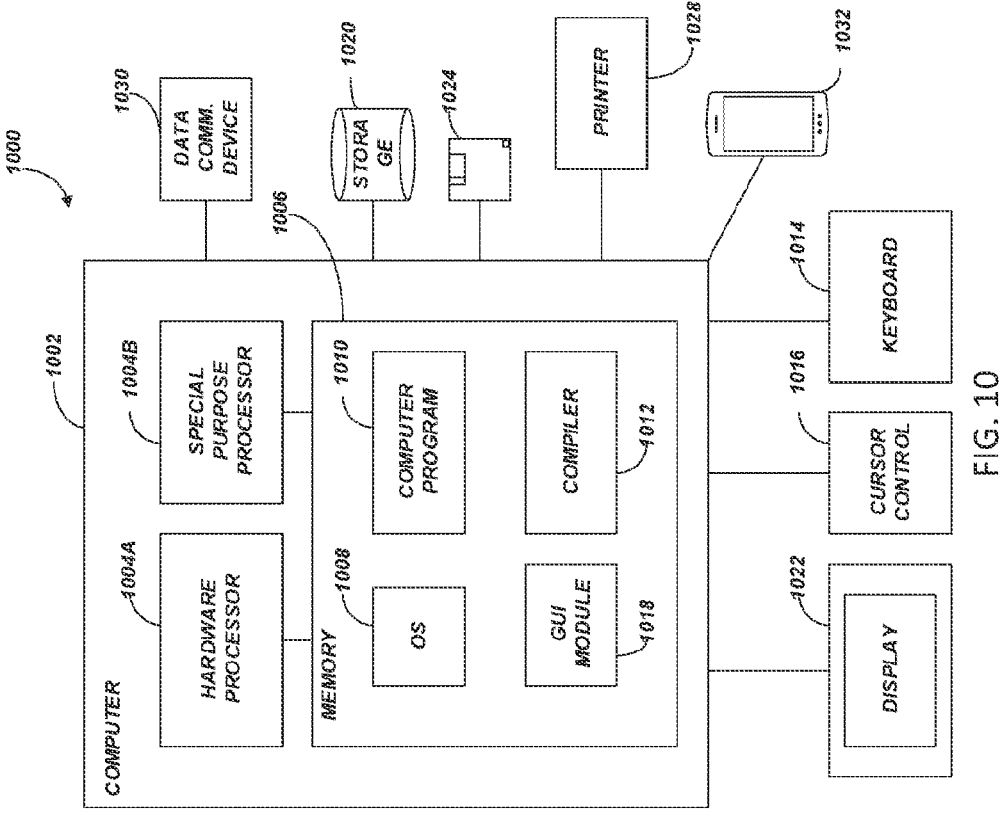

FIG. 10 illustrates a hardware environment for implementing the methods described herein.

Figure 11:
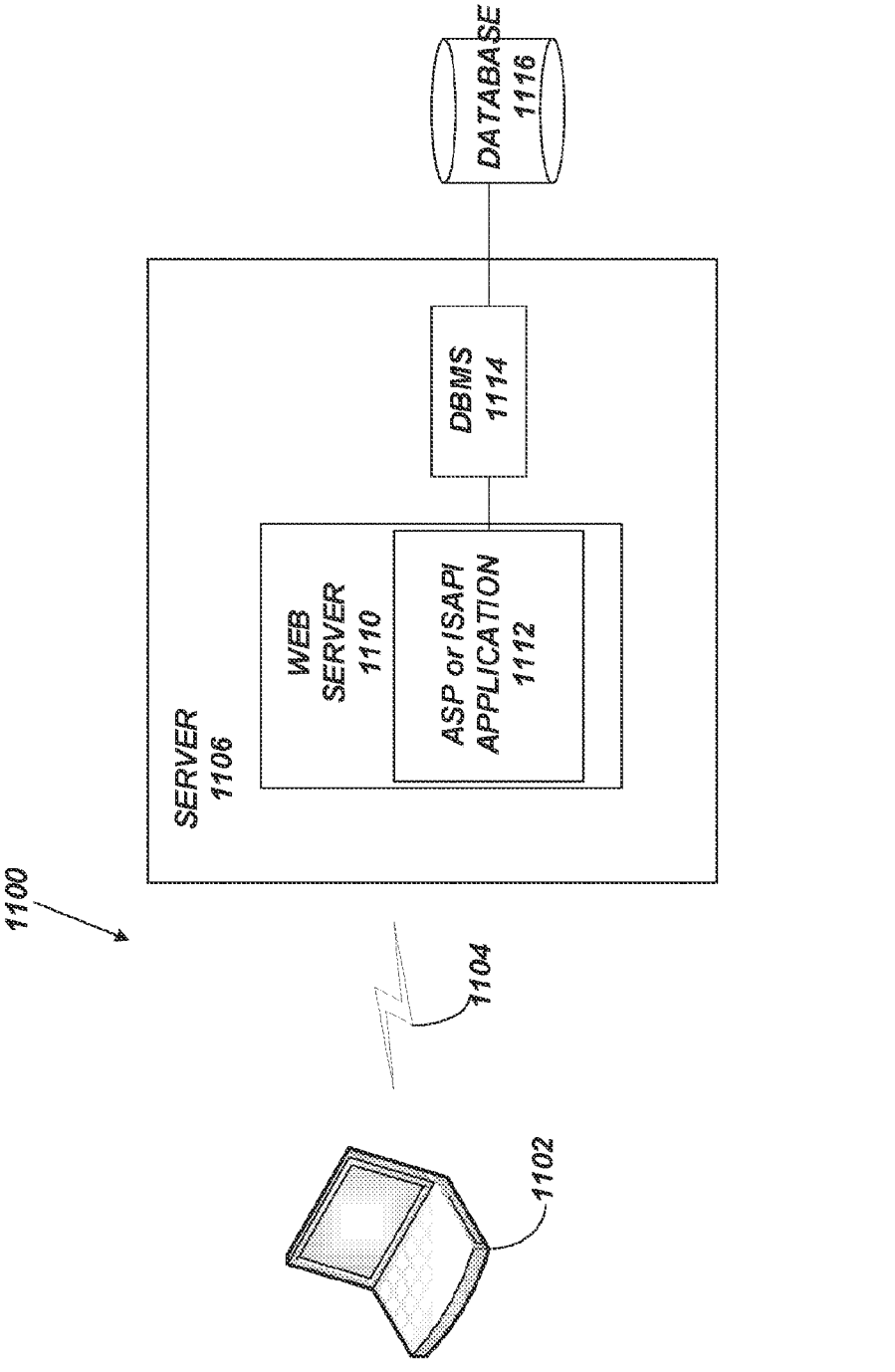

FIG. 11 illustrates a network environment for implementing the methods described herein.

Figure 12:
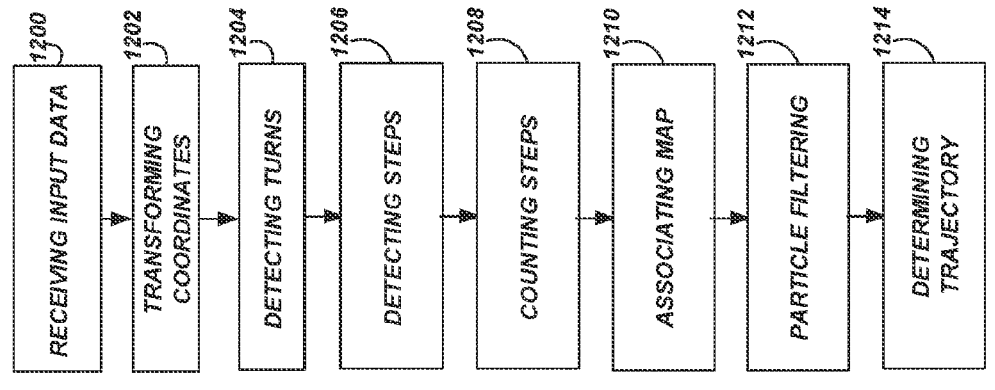

FIG. 12. Flowchart illustrating a method of determining a trajectory.

Figure 13:
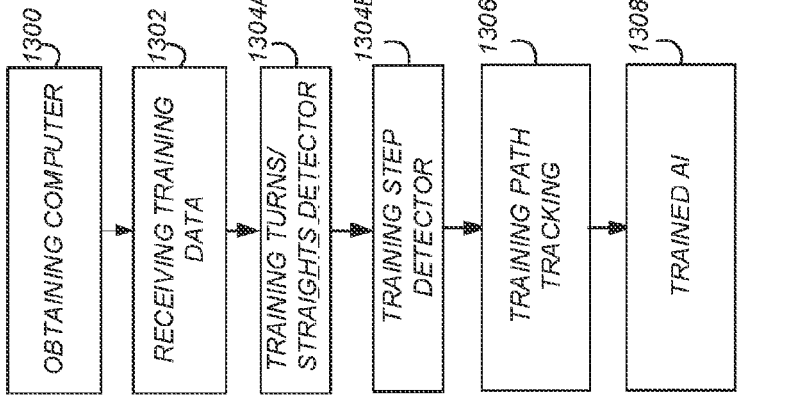

FIG. 13. Flowchart illustrating a method of training machine learning algorithms for step counting, turn detection, and path reconstruction.

Figure 14D:
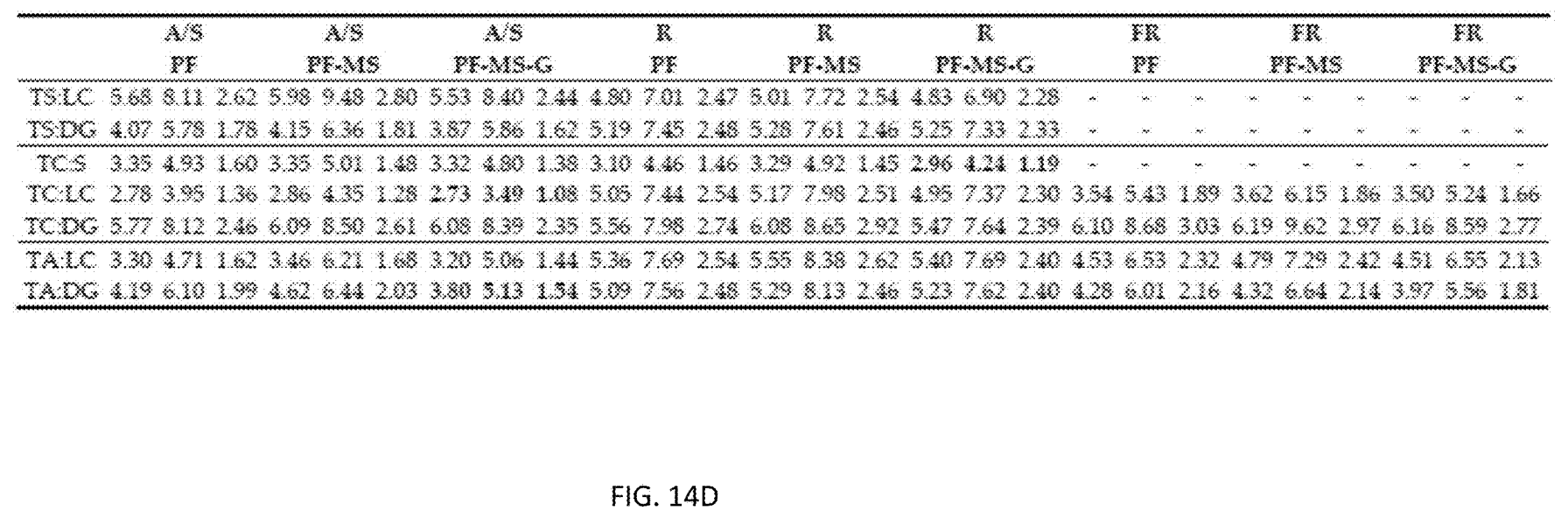

FIG. 14: Tables 1-4.

Figure 15:
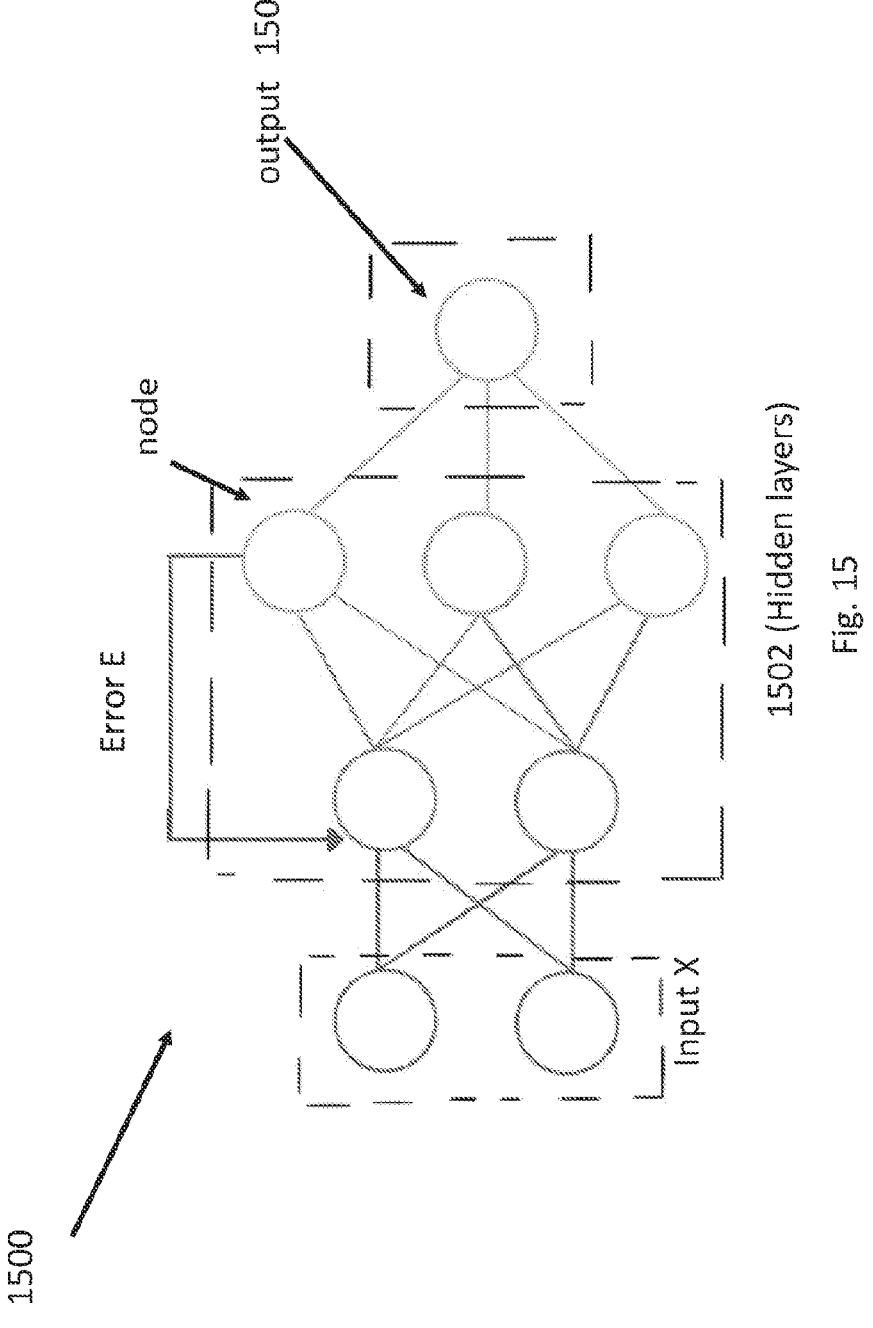

FIG. 15. Example Neural Network.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Embodiments of the present invention use a new, two-stage algorithm for turn detection, which gives very reliable results. Embodiments of the present invention also combine particle filtering with pedestrian dead reckoning systems, which is shown to reduce the influence of orientation drift.

Among the communities of potential users of this technology, blind travelers arguably stand to benefit the most. Wayfinding can be extremely challenging for those without sight, who do not have access to landmarks and other visual information. Blind individuals can easily get lost in unfamiliar environments, which may discourage independent travel for these individuals. Reliable pedestrian tracking systems could improve safety and confidence for blind people navigating a shopping mall, a hospital, or a transit hub.

Although, in principle, the same mechanisms designed for sighted people could also be used by blind travelers, the gait characteristics of blind individuals using a long (white) cane or a dog guide are different from those of sighted walkers [13-16]. For example, use of a long cane (e.g., using the two-point touch technique [17]) may result in large side-to-side swings. When "shorelining" a wall to maintain a straight trajectory, vibrations from the cane hitting the wall may be picked up by the smartphone's accelerometer. Walking without sight often leads to bumping onto obstacles or even into people, requiring one to stop and re-orient. These events (combined with other situations, such as negotiating a doorway or opening a door) contribute spurious inertial measurements that could challenge odometry algorithms designed for "cleaner" data associated with sight-assisted walking. Hence, it is important to evaluate these systems on "real" data from blind walkers. Illustrative embodiments of the present invention evaluate the odometry algorithms using the WeAllWalk dataset [16], which is the only publicly available collection of inertial data from blind individuals. WeAllWalk contains inertial data from 10 blind participants, each carrying two iPhones, who traversed a number of paths in two different buildings using a long cane or a dog guide as travel aid.

1. Example Training Data Set: The WeAllWalk Dataset

WeAllWalk ( ) [16] contains data collected from ten blind and five sighted participants. Nine of the ten blind walkers used a long cane while walking. Two of them repeated the trials using their dog guide. One participant only used her dog guide. The sighted participants and eight of the blind participants walked along six different routes: T1-T4 in one building, and T5-T6 in a second building. The last two blind participants walked on two long routes (T7-T8 for one participant, T9-T10 for the other participant) in the second building. Cumulatively, participants in WeAllWalk walked for 7 miles. Routes were chosen to have a variety of lengths (from 75 to 300 m) and complexities (including multiple 45°, 900 and 180° turns). In some cases, a turn was preceded or followed by a door that had to be opened. The space where data collection took place was partitioned in rectangles ("straight" or "turn") defined on the floor maps; this information is also provided with the dataset. Specifically, for the i-th path, a set $$\{P_j^i\}$$

of consecutive segment endpoint locations (waypoints) is provided.

Participants carried two smartphones (iPhone 6s), placed in different locations of their choice on their garments. Each smartphone recorded data (sampled at 25 Hz and time-stamped) from its tri-axial accelerometers, gyroscopes, and magnetometers, as well as attitude data produced by the iOS Core Motion framework via Apple's proprietary sensor fusion algorithms. Heel strike times were recorded for each foot using two inertial sensor units clipped to the participants' shoes. Overall, approximately 20,000 heel strikes were recorded.

The time elapsed from the beginning to the end of each route traversal was divided into contiguous intervals, where each interval corresponds to the participant either walking along a "straight" segment in the path, or walking on a "turn" segment. In addition, the dataset provides time-stamped annotations of features (136 overall), defined as particular events such as opening a door, bumping into an obstacle, being caught in a door opening, or stopping momentarily. These events are normally associated with anomalous characteristics in otherwise regular inertial data time series.

2. Example System Algorithms

In this section, we describe the individual algorithms used for path reconstruction. The inertial data of interest from the phones include: attitude, defined as the 3-D orientation with respect to a fixed "world" reference frame with Z axis pointing in the direction of gravity; gyro, a 3-D vector with angular velocities; acceleration, as measured by the 3 axes of the accelerometer; user acceleration, which is a 3-D vector with the actual phone acceleration (i.e., with gravity removed). Note that all of these quantities (except for gyro and acceleration) are obtained using the device's sensor fusion algorithm from data acquired by the onboard accelerometers and gyroscopes. From this data, we also derive Azimuth (or heading) can also be derived from this data.1 Azimuth can be defined as the angle between the Y axis of the phone frame, projected onto the horizontal plane (defined by X and Y axes of the world frame), and the Y axis of the world frame. It is important to note that attitude and, thus, azimuth are prone to drift, wheredrift can be modeled as a slowly varying bias.

2.1. Step Counting

A step counting system based on LSTM [70] (a popular type of RNN) was used, however other equivalent such systems can also be used. For example, the work (e.g., [32]) used a bi-directional LSTM, which can increase robustness by considering a whole batch of data at once. This approach might not be appropriate for wayfinding or assisted return application, where timely step detection is necessary (e.g., to constantly track the position of the walker in the route.) Therefore, a regular, uni-directional LSTM was used in the system described herein. The LSTM version used herein takes in input user acceleration (over 3 axes) and rotation rate (over 3 axes). These vectors are pre-multiplied by the inverse of the attitude matrix, in order to obtain a heading-agnostic reference frame [10]. The data for each axis are normalized to zero mean and unit variance. The LSTM is trained to produce a sequence of values that are close to the desired output, represented by a sequence that is uniformly equal to 0 except for the times of occurrence of a heel strike, when it is set to 1 (more precisely, each impulse was transformed into a narrow triangular wave with length of three samples). The LSTM is trained with Keras using 100-samples windows (4 s), and least squares loss. Note that the output of LSTM is a sequence of numbers between 0 and 1, and is transformed to a binary signal by applying a suitable threshold S. For each sequence of consecutive LSTM output samples that exceed this threshold, the mid-point was selected to be the time of estimated heel strike. The LSTM version used herein uses a 2-layer network with hidden unit size of 6. Initial experiments showed that the network was deep enough for the task, and that adding more layers would increase the risk of overfitting. The Adam optimizer and dropout was used for regularization. Training was performed with batch size of 256 and initial learning rate of 0.005 (decreased by a factor of 2 after 50 epochs) over a total of 64 epochs.

Examples of step detection are shown in FIG. 1. Although the step counter works robustly in most conditions, in some examples it was noted that the LSTM output exhibits a decaying oscillatory behavior when the user stops walking. In addition, sometimes the first one or two steps may be missed when the user starts walking. In one or more examples, the algorithms may be trained to mitigate for these missed steps and the oscillatory behavior.

2.1.1. Stride Length

In order to use step counting for odometry, the system needs to define the walker's stride length. A number of techniques have been proposed for stride length estimation from inertial data [46-48], including recent approaches using deep networks [33,34]. Several of these algorithms were used, but they failed to obtain consistent and accurate results in the system. So a fixed stride length SL, regressed from the known lengths of the paths traversed in WeAllWalk, as well as the ground-truth number of steps in each path for each participant in the training set were used.

2.2. Two-Stage Turn Detection

Figure 2:
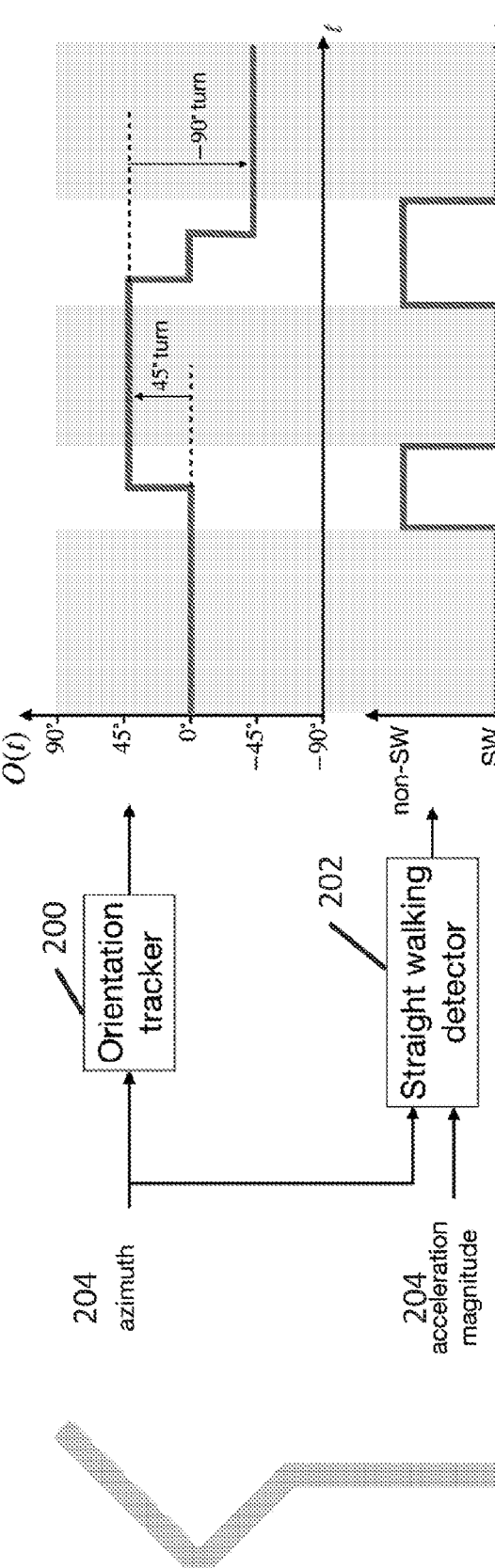
FIG. 2. Diagrammatic example of our two-stage turn detector. The blue line (left) represents a path taken by a walker, with a 45° (left) turn, followed by a –90° (right) turn. A turn is detected by comparing the orientation O(t) produced by the orientation tracker between two consecutive straight walking (SW) segments (highlighted in yellow).

The trajectory of a walker in an environment characterized by a network of straight corridors crossing at discrete angles (e.g., multiples of 450 or 90°) can in most cases be described as a sequence alternating straight segments with turns, with discrete turning angles. When designing a turn detector to be used by blind walkers, one needs to consider various situations that may trigger a false detection. For example, the walker may stop and rotate their body to re-orient themselves. Walkers may need to swerve when avoiding a perceived obstacle, or when mistakenly veering off a straight path. In order to reduce the likelihood of false detections, a simple two-stage procedure for robust turn detection was developed. The system (shown in FIG. 2) is comprised of an orientation tracker, which returns the discrete angle of the walker's orientation in the horizontal plane; and of a straight-walking (SW) detector, which identifies the time periods in which the user is walking on an approximately straight path. The idea is that a turn is not expected to occur during a SW segment; whereas any numbers of turns could be detected (correctly or otherwise) outside such intervals. A turn is declared when the user's orientation during a SW segment is different than in the previous SW segment.

2.3. Straight Walking (SW) Detector

Figure 3:
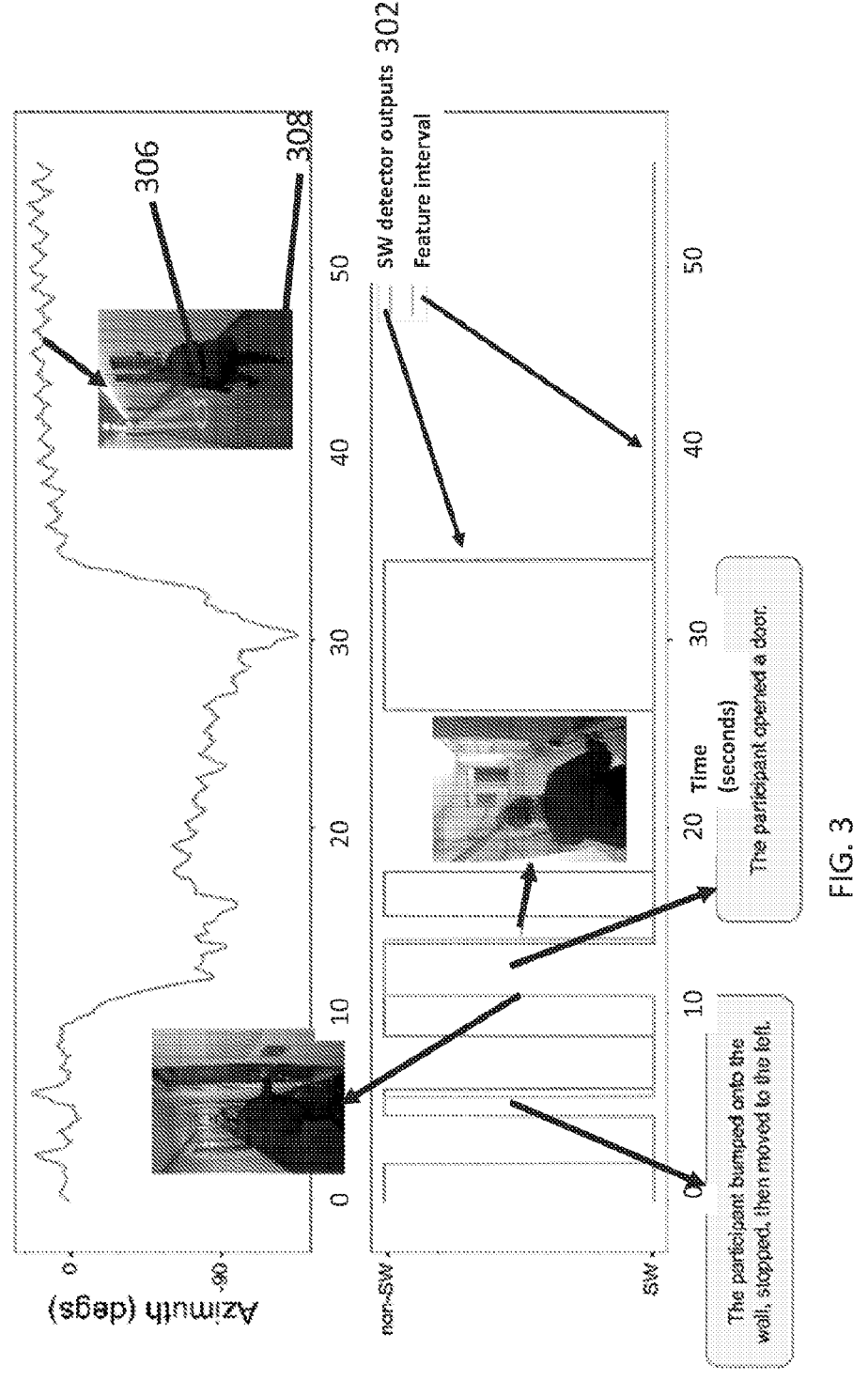
FIG. 3. Example of SW segment detection using our GRU system. Top: Azimuth signal; Bottom: output of SW detector (blue line), shown together with the segments marked as "features" in WeAllWalk (orange line).

The straight walking (SW) detection system used herein is designed to identify time intervals during which the user walks on a straight path. SW detection is performed using a GRU, which is a simple type of recurrent neural network [71]. The GRU used in the system described herein processes a pair of signals: the azimuth angle and the user accelerometer magnitude (previously smoothed by a Gaussian filter with \sigma=15). The GRU is trained on data samples recorded within straight segments (after removing feature sub-segments), as these are considered to be representative of SW segments. Sub-segments were manually annotated at the beginning and at the end of each trial, when the user was known to be standing still, and removed from the data labeled as SW. Data from these sub-segments, as well as data from feature sub-segments and data from turn segments, are labeled as non-SW. The GRU is tasked with predicting the label value with a delay of approximately 1 s (30 samples). This was considered an acceptable trade-off between timeliness (which calls for small delay) and the need to see enough forward data to correctly predict the label after a transition. The system was trained using Keras, using 150-samples windows. Other training parameters include: GRU hidden unit size of 32; drop-out rate of 0.4; 3 training epochs, batch size of 2048. An example of SW detection using our GRU system is shown in FIG. 3.

2.4. Orientation Tracker

The goal of this module is to track the walker's orientation from azimuth data in the face of slowly changing drift. We assume that the walker is at each time t in one of N fixed orientations $$\{O^k(t) = k \cdot 360°/N\} \tag{1}$$

where N=8 or 4 (orientations at multiples of 450 or 90°, respectively). The sequence of orientations is modeled as a Markov chain. The azimuth measurement, $\theta(t)$, is assumed to be affected by drift, d(t), which is modeled as a random walk [72], with additional white Gaussian noise. We use the standard Gauss-Markov hypothesis to write:

$$p\big(\theta(t) \mid O(t), d(t), \theta(1{:}t-1)\big) = p(\theta(t) \mid O(t), d(t)) = N\big(O(t) + d(t), \sigma_\theta^2\big) \tag{2}$$

$$p\big(d(t) \mid d(t-1), \theta(1{:}t-1)\big) = p(d(t) \mid d(t-1)) = N\big(d(t-1), \sigma_d^2\big)$$

-continued $$P\big(O^k(t) \mid O^m(t-1), \theta(1{:}t-1)\big) =$$

$$P\big(O^k(t) \mid O^m(t-1)\big) = \begin{cases} q, & m = k \\ (1-q)/2, & |m-k| = 1 \\ 0, & \text{otherwise} \end{cases}$$

In the equations above, $\theta(1{:}t-1)$ represents the sequence of azimuth measurements before time t. $N(\mu, \sigma^2)$ is a normal distribution, while 9 represents the prior probability that the user's orientation does not change in two consecutive time instants. Note that turns $O^m(t-1) \rightarrow O^k(t)$ by more than the prescribed interval 360°/N (i.e., $|m-k| > 1$) are not allowed in this model. For example, if N=8, a turn by 90° would be tracked as two consecutive turns by 45°.

A Mixture Kalman Filter (MKF [73]) was used to compute the posterior distribution of discrete orientations $P(O^k(t)|\theta(1{:}t))$ and of drift $p(d(t)|\theta(1{:}t))$ at each time. The MKF algorithm maintains a list of orientation sequences, with a Kalman filter associated with each sequence. At each time instant, a new orientation is added to each sequence by sampling from the posterior distribution $P(O(t)|\theta(1{:}t))$. Our MKF system maintains a set of 50 Kalman filters, which go through a standard process of resampling and rejuvenation [73]. The walker's orientation at time t is taken to be the maximizer of $P(O(t)|\theta(1{:}t))$. The parameters $\sigma_\theta$, $\sigma_d$, and q are learned from the training data by finding (via grid search) the minimum of the weighted sum of overcount and undercount rates of the two-stage turn detector, as defined later in Section 7.2. Note that we give a larger weight (equal to 2.5) to the undercount rate, because we noted that turn undercounts often affect the reconstructed path more than turn overcounts, possibly because two consecutive incorrectly detected turns with opposite angles compensate for each other.

2.5 Turn Detection

In our two-stage system, turn events are detected when the discrete walker's orientation O(t) in a SW segment is different from that in the previous SW segment. Note that the orientation of a walker is not expected to change in a SW segment. However, occasionally a change in orientation is observed, typically at the beginning of the segment. This may happen if the MKF system reacts with some delay to a change in orientation associated with a turn. To remove the risk of these situations, the mode of the orientations is computed in each SW segments, and compared with the mode of orientations in the previous SW segment for turn detection.

The orientation resolution (45° or 90°) to be chosen for the MKF orientation tracker depends on the specific environment. Although most corridor networks intersect at +90°, in some cases intersections at multiples of ±45° should be accounted for. For example, in the WeAllWalk dataset, 13% of all turns are ±45° turns. Note that a change of orientation by 180° or (when using orientation resolution of 45°) by ±90°, is often detected as a close sequence of orientation changes by ±90° (or ±45°). This is usually not a problem in our two-stage strategy, where turns are declared only by comparing the orientation in two consecutive SW segments. For example, if a sequence of two 45° turns is detected during a non-SW segment, our system will declare that one 90° turn occurred (see FIG. 2).

Figure 4A:
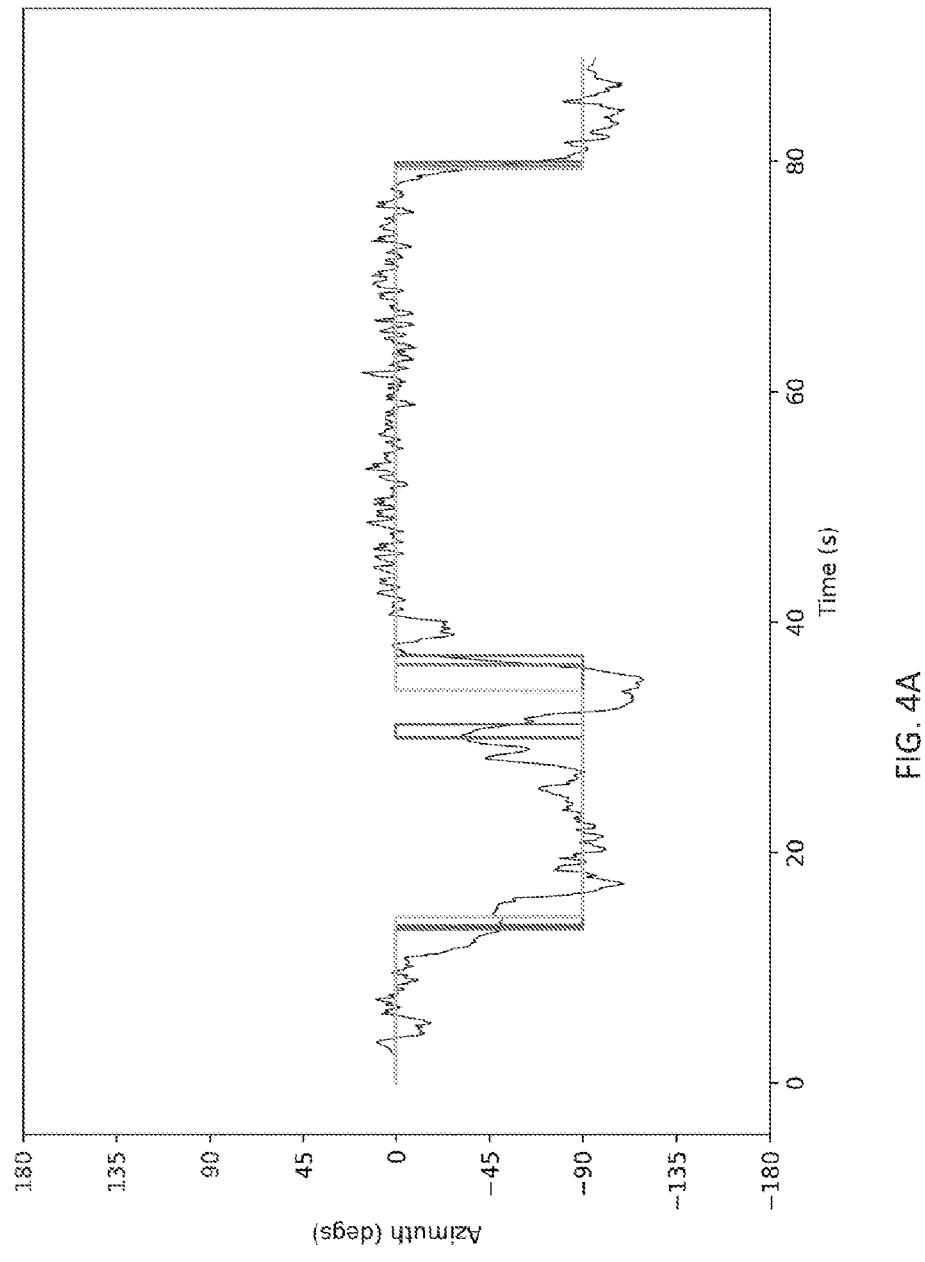
FIG. 4. Example of two-stage turn detection. Black line: azimuth signal. Green line: walker's discrete orientation as tracked by MKF. Orange line: walker's discrete orientation as obtained by integrating the turns detected by the two-stage system. Red line: ground-truth walker's discrete orientation. The orientation resolution of the MKF was 90° (FIG. 4A) or 45° (FIG. 4B).
Figure 4B:
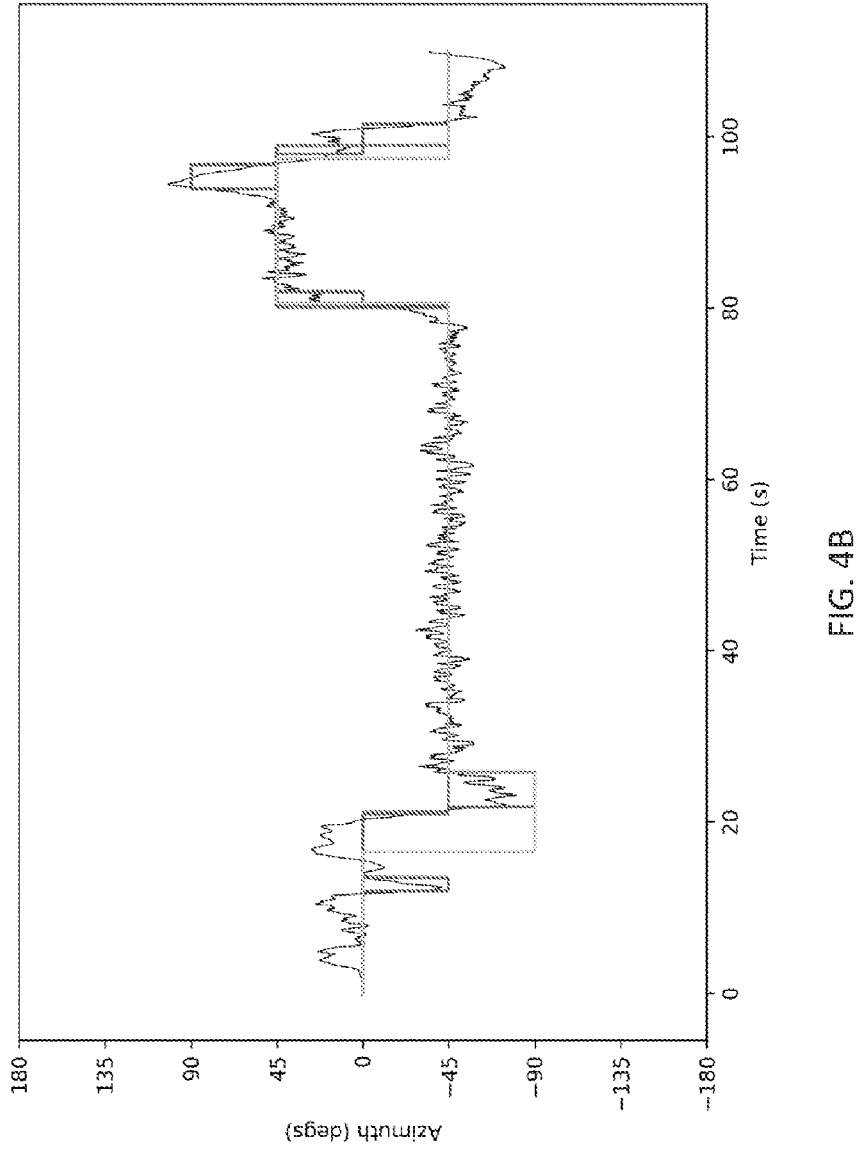

Sample results from our two-stage turn detection system are shown in FIG. 4 (SW detection is not shown in these figures). Note that in FIG. 4a, at around t=30 s, a close sequence of orientation changes (left then right) as measured by the MKF was triggered as a consequence of the walker veering off the straight path (note the large variation in azimuth angle). As this happened outside of a SW period, these incorrectly detected turns were rejected by the two-stage system. A similar situation can be observed in FIG. 4*b*, where the MKF was set to measure orientations at multiples of 45°.

3. Example Application of RoNIN

RoNIN [10] is a deep network end-to-end odometry algorithm that was shown to outperform comparable systems in challenging datasets. It uses acceleration and gyro data, along with attitude data, to compute velocity vectors which, integrated over time, produce the user's position. (The RoNIN body heading network was not used). RoNIN uses a heading-agnostic reference frame. In practice, the 3-D vectors of acceleration and gyro are pre-multiplied by the inverse of the attitude matrix, so that they effectively are defined on a fixed "world" reference frame with Z axis pointing in the direction of gravity. Although this reference frame normalization was shown to enable robust odometry, any drift accumulated in the computed attitude also reflects in the velocity vectors produced in output.

In order to apply RoNIN to the WeAllWalk inertial data, it is first necessary to up-sample (via linear interpolation) the data from the original acquisition rate of 25 Hz to 200 Hz, which is the rate at which sensor data were collected for RoNIN training. An open source implementation of RoNIN—the RoNIN resnet18 architecture—was used. Since the data used for training RoNIN came from sensors that are different from those in the iPhones used in WeAll-Walk, results may be different than expected. As a simple customization, a constant scaling factor was regressed to minimize the discrepancy between the magnitude of the velocities computed by RoNIN and of the ground-truth velocities in WeAllWalk. Least squares regression was used to compute an appropriate scaling factor (found to be equal to 1.27) to be applied to the velocity vectors produced by RoNIN.

A more extensive customization of RoNIN, created by fine-tuning the network on WeAllWalk data can also be used. Note that RoNIN requires ground-truth values for the walker's location and orientation at all times, defined with respect to the world reference frame used to define the phone attitude; whereas WeAllWalk only contains the times at which each walker crossed specific waypoints. To generate the missing data, the walker's location was interpolated between straight segments' waypoints assuming constant velocity with the assumption that, in a given segment, walkers maintained a constant orientation parallel to the corridor. In order to recover the walker's orientation with respect to the world reference frame, the orientation estimated at each time by the original RoNIN network was used. The RoNIN network resnet18 architecture was then fine tuned for two epochs, with the minibatch size set to 128, using the Adam optimizer with a learning rate of 0.0001. This customization was only considered for the blind walkers, given that the original RoNIN was already trained on sighted walkers. Indeed, it was verified that fine-tuning the algorithm on the sighted walkers in WeAllWalk did not lead to noticeable improvements.

4. Example Particle Filtering

When a map of the environment is available, the constraint of wall impenetrability can benefit path reconstruction. Bayes filtering (in particular, particle filtering [9]) is typically used in these situations, as it can easily incorporate the wall impenetrability constraint by postulating an appropriate form for the joint distribution of the state s being tracked. For example, if the state contains the location of the walker, the joint probability P(s(t), s(t+Δt)), where Δt is the sampling period, is set to be 0 if s(t) and s(t+Δt) identify two locations across a wall from each other. Particle filtering is a particular form of Bayes filtering wherein the posterior distribution of the state is represented by a set of samples (particles). Statistics such as the posterior mean can be obtained by simply computing the mean location of these particles.

In the disclosed implementation, the particle filter receives in input a sequence of velocity vectors $v(t)=\|v(t)\|\cdot[\cos \theta(t), \sin \theta(t)]^T$, which are generated either by the RoNIN algorithm (in its original or fine-tuned version, and subsampled to a rate of 25 Hz), or by forming a vector in the direction of the azimuth, as measured by the phone, with length equal to the stride length considered, divided by the duration of the current step, as measured by our step counter. The state being tracked has two components: the current location of the walker, $P_t$, and the current drift angle, $d_t$. State evolution is modeled as:

$$P(t + \Delta t) = \tag{3}$$
$$P(t) + (\|v(t)\| + n_v) \cdot [\cos(\theta(t) + d(t) + n_\theta), \sin(\theta(t) + d(t) + n_\theta)]^T \cdot \Delta t$$
$$d(t + \Delta t) = d(t) + n_d$$

Here, $n_v$, $n_\theta$, and $n_d$ represent mutually uncorrelated zero-mean Gaussian white noise. Standard deviations of $n_\theta$ and $n_d$ were set to 0.01 rads and 0.005 rads, respectively, where these values were found empirically through preliminary tests. System performance is sensitive to the choice of the standard deviation $\sigma_v$, of $n_v$, and, as a result, this value was determined systematically through grid search on training data. The location of the starting point in the map is assumed to be known, and an initial alignment procedure (similar to [10]) performed by matching the path reconstructed in the initial few seconds with the orientation of the corridor where the starting point is located. The particle filter uses 1000 particles.

Figure 5:
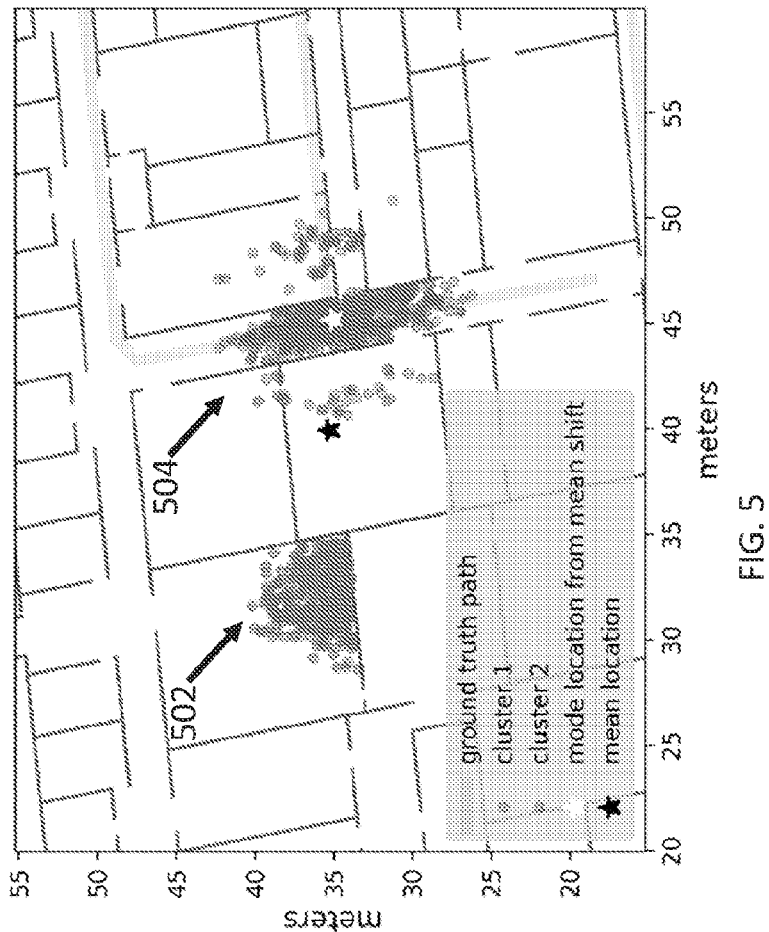
FIG. 5. The set of particles at a certain time during tracking. Note that the particles are distributed in two main clusters (shown in different colors). The mean particle location (posterior mean), shown by a black star, is in an incorrect position. The highest mode of the distribution, as found by mean shift, is shown by a white star.
Figure 5:
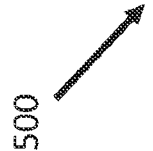

A problem with Bayes filtering as applied for path reconstruction is that it often produces bi-modal posterior state distributions (see FIG. 5). In these situations, the posterior mean often falls in areas of low probability (in-between the modes). In practice, this means that the mean location of the particles may fall in a location that appears to break the wall non-penetrability constraint. Rather than the posterior mean, one could consider the modes (maximizers) of the posterior distribution, which are relatively immune to these artifacts. For example, Fusco and Coughlan [63] used a kernel density estimator to find the mode of the state posterior distribution. We took a different route and used the mean shift algorithm [74], a technique based on gradient ascent to find the modes of a distribution expressed as a set of samples. Our Particle Filtering-Mean Shift (PF-MS) algorithm thus estimates the walker's location as the location of the highest mode identified by Mean Shift. If one is interested only in the reconstructions of the whole trajectory (and not in instantaneous location estimation), a variation of PF-MS can be used. Specifically, one can track the modes of the posterior state distribution, by associating a mode at time t+t with the mode at time t that shares the largest number of supporting particles. At the end of the trajectory, the highest mode of the final posterior distribution is found, then the chain of pair-wise associated modes in the previous time instants is reconstructed. We named this "global" strategy PF-MS-G. We used the python mean shift implementation from sklearn, setting the bandwidth to 5 m, a value found empirically in preliminary tests.

The digital maps of the building walls were obtained by tracing the original maps provided as part of WeAllWalk using the SIM web application [75]. We assumed that all doors in the buildings were open, meaning that the estimated paths could potentially go through such doors into rooms (even though the participants only walked along the buildings' corridors)

5. Example Training and Test Modalities

The algorithms discussed in Sections 3-4 contain a number of trainable parameters, and specifically: the parameters of the LSTM used for step counting, along with the threshold on the output of LSTM and the stride length (Section 2.1); the values for $\sigma_\theta$, $\sigma_d$, and q in the MKF used for orientation tracking (Section 2.2); the parameters of the GRU used for SW detection (Section 2.3); and the value of $\sigma_v$ for the particle filter. In addition, as discussed in Section 3, the RoNIN algorithm was fine-tuned for the blind participants.

Since the walking characteristics of blind persons using a long cane or a dog guide are expected to be different [76] from each other, we stratified the results by community of long cane users (denoted by the modifier :LC) and dog guide users (:DG). The following training and test schemes were considered Train on Sighted (TS). All parameters are computed using data from the five sighted walkers in WeAllWalk. The system is tested on the two community of blind users (TS:LC, TS:DG). This may be representative of a situation in which a system designed for sighted walkers is used by blind walkers, without any customization.

Train in same Community (TC). In this case, the system tested with long cane users, dog guide users, and sighted users, was trained with data from walkers in the same community. The Leave-One-Person-Out cross-validation policy [77] was used: each participant was tested with the system trained on data from all other participants in the same community. This training modality allows us to test the hypothesis that walking characteristics may be different between communities of users. If this hypothesis is true, one may expect that training the system on the same community of users who are meant to use it should give improved results. In addition to the two communities of blind participants (TC:LC, TC:DG), for this modality only we also present results for the sighted participants (TC:S). The latter quantity may be representative of a conventional system, trained and tested on sighted users, and can be used as a benchmark. Of note, only three walkers in WeAllWAlk used a dog guide, and, thus, each training set in the TC:DG modality contain data from two walkers only.

Train on All (TA). All available data in WeAllWalk were used for training, using the Leave-One-Person-Out cross-validation policy (TA:LC, TA:DG). For example, a long cane user is tested with a system trained with data from all sighted participants, all dog cane users, and all other long cane users.

For all tests in each modality, the measured quantities of interest are averaged over both iPhones carried by the participants, all paths, and all participants in the test set. Note that the system used to test any given walker was never trained on data from that walker.

5.1 Step Counting Training

Figure 6:
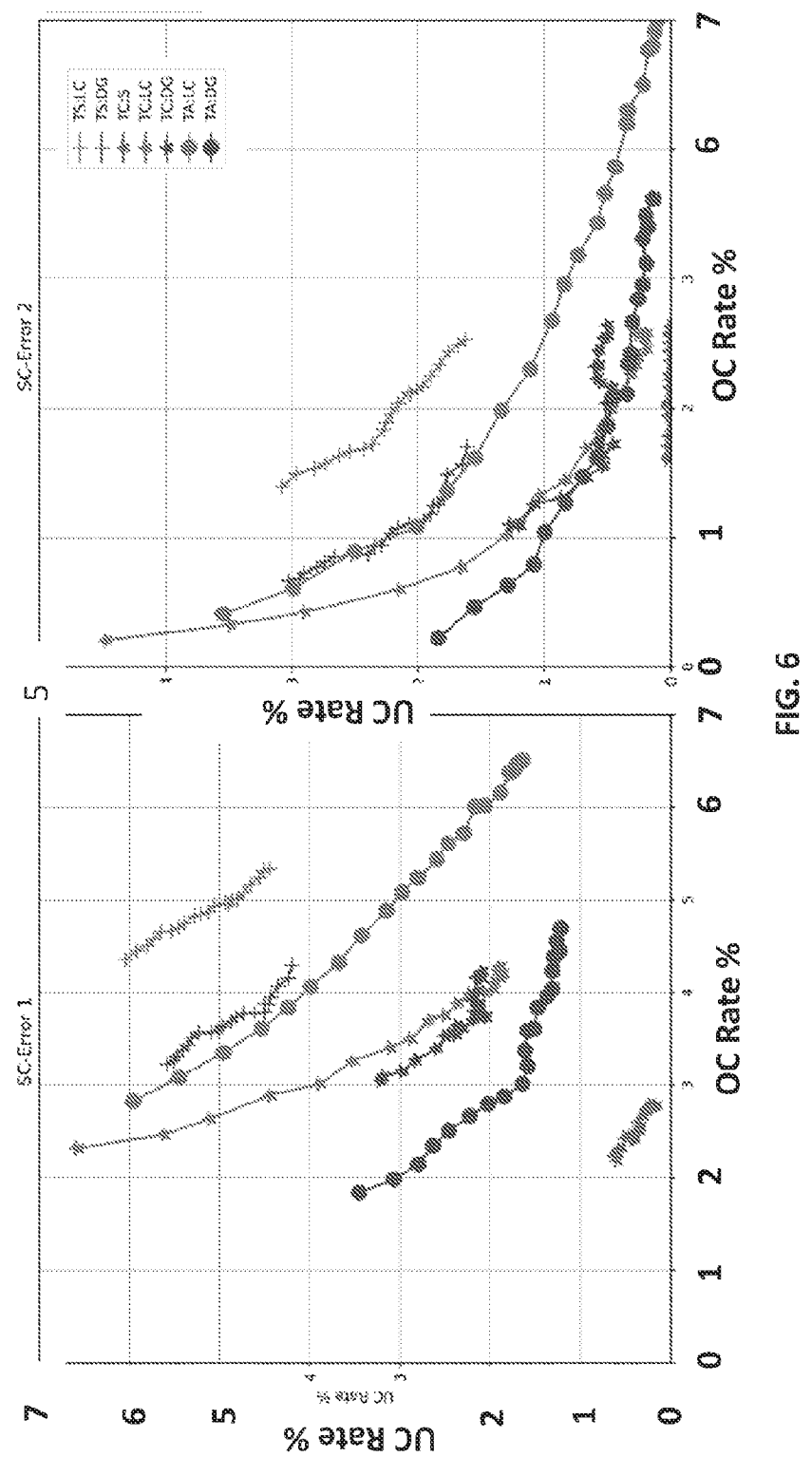
FIG. 6. UC rate vs. OC rate curves as a function of the threshold S on the LSTM output FIG. 7. An illustration explaining the metrics used to evaluate the quality of an estimated trajectory $P^i(t)$ (shown as blue line after alignment). The gray shape shows the location of the corridors along the path, with individual segment separation shown in red. Waypoints $$(\overline{P}^i_j)$$

Two different error metrics were considered for the step counter. The first metric (SC-Error 1) is a variation of the metric with the same name in [16]. The midpoint between any two consecutive ground-truth heel strike times is computed, and the number of detected steps between two consecutive such midpoints is counted. Note that there is exactly one ground-truth heel strike within this interval. If n>1 steps are detected within this interval, n−1 overcount events are recorded. If no steps are detected, an undercount event is recorded. For the second metric, SC-Error 2 [16], the difference between the number of detected steps in a WeAll-Walk segment and the number of ground-truth heel strikes in the same segment is recorded as overcount (if positive) or undercount (if negative). The total number of overcount and undercount events in each path is normalized by the total number of ground-truth heel strikes to produce an undercount (UC) rate and an overcount (OC) rate. Note that increasing the threshold S on the output of the LSTM (Section 3.1) normally results in an increase in the UC rate and a decrease in the OC rate. This is shown in FIG. 6, where the UC rate vs. OC rate is plotted as a function of S. For the test results shown in Table 1, the threshold S is set to a value that equates the OC and UC rates of SC-Error 2 measured in the training data. The values of S thus computed, averaged over all cross-validation rounds, are also shown in Table 1, along with the average value of stride length SL regressed from the training data as discussed in Section 2.1.

TABLE 1

Undercount (UC) and overcount (OC) rates for our step counter, along with the mean threshold S and stride length SL. For each community of blind walkers (LC, DG), the pair (UC rate, OC rate) with the smallest value of their sum is shown in boldface.

| | SE-Error 1 | | SE-Error 2 | | | Mean |
| --- | --- | --- | --- | --- | --- | --- |
| | UC Rate % | OC Rate % | UC Rate % | OC Rate % | Mean S | SL (m) |
| TS:LC | 10.58 | 2.51 | 8.20 | 0.13 | 0.78 | 0.74 |
| TS:DG | 8.74 | 2.08 | 6.75 | 0.10 | 0.78 | 0.74 |
| TC:S | 3.03 | 1.05 | 2.24 | 0.26 | 0.78 | 0.74 |
| TC:LC | 3.22 | 3.27 | 0.91 | 0.96 | 0.55 | 0.55 |
| TC:DG | 4.99 | 2.15 | 3.23 | 0.39 | 0.68 | 0.62 |
| TA:LC | 4.06 | 3.80 | 1.42 | 1.17 | 0.56 | 0.62 |
| TA:DG | 2.29 | 2.55 | 0.83 | 1.08 | 0.55 | 0.62 |

5.3. Turn Detection Training

To quantitatively assess the performance of our two-stage turn detector (Section 2.2), the sequence of detected turns against the ground-truth sequence of turns in each path was compared using Levenshtein distance. Specifically, the longest ordered matching subsequences within the two turns sequences were identified, then errors in terms of overcounts (detected turns that were not matched in the ground-truth sequence) and undercounts (ground-truth turns that were not matched in the detected sequence) reported. Note that, in the case of a 45° ground-truth turn, a 90° turn detector would either not detect the turn, or detect it as a 90° turn, where both cases represent an incorrect result. To simplify analysis of the results, the 45° turns and any associated 90° turn detection from the analysis of the 90° turn detector were removed. When assessing the 45° turn detector, all ground-truth 90° turns were split as well as all measured 90° turns into two consecutive 45° turns. The number of turn undercounts and overcounts was divided by the total number of ground-truth turns to obtain the undercount (UC) and overcount (OC) rates, which together define the turn detection (TD) error. Results are shown in Table 2.

TABLE 2

Undercount (UC) and overcount (OC) rates for the turn detector (45° and 90° turns). For each community of blind walkers (LC, DG), the pair (UC rate, OC rate) with the smallest value of their sum is shown in boldface.

| | 45° TD-Error | | 90° TD-Error | |
| | UC Rate % | OC Rate % | UC Rate % | OC Rate % |
| --- | --- | --- | --- | --- |
| TS:LC | 0.64 | 6.85 | 0 | 1.87 |
| TS:DG | 1.14 | 4.49 | 0.81 | 0.81 |
| TC:S | 0 | 0 | 0 | 0 |
| TC:LC | 1.64 | 3.98 | 0.54 | 0.26 |
| TC:DG | 1.11 | 4.30 | 0 | 0.79 |
| TA:LC | 0.37 | 3.51 | 0 | 0.79 |
| TA:DG | 1.15 | 5.39 | 0 | 0.83 |

5.4. Example Evaluation Metrics

Each reconstructed trajectory is compared with the ground-truth path. WeAllWalk does not provide detailed information of the walkers' location at each time, but only the timestamps $$\{t_j^i\}$$

indicating when a walker reached individual waypoints. We will make the simplifying assumption that walkers were located in the middle of the corridor width when transitioning between segments through each such waypoint.

Given a trajectory estimated for a walker in a path, $P^i(t)$, we use the locations at the waypoint timestamps, $$\{P^i(t_j^i)\}$$

to first align this trajectory with the ground-truth path. This standard procedure [78] is necessary because the reference frame used to represent the trajectory is undefined. Specifically, we find (using Procrustes analysis) the rotation and translation that minimizes the mean squared distance between the locations $$\{\bar{P}_j^i\}$$

(the ground-truth location of the waypoints) and $$\{P^i(t_j^i)\}.$$

After alignment, we evaluate the goodness of the estimated path using three different metrics. The first metric considered is the RMSE of estimated waypoint locations:

$$RMSE_{wp} = \sqrt{\frac{1}{N}\sum_j \|\bar{P}_j^i - P^i(t_j^i)\|^2} \tag{4}$$

where N is the number of waypoints in the path. For the remaining metrics, r a sampling of the estimated trajectory into $$N_e^i$$

points $$\{Q_m^i\}$$

with a uniform inter-sample distance of 1 meter is considered. Likewise, the segments joining consecutive waypoints at intervals of 1 meter were sampled, resulting in $$N_{gt}^i$$

points $$\{\bar{Q}_n^i\}$$

representing the path. We then compute the Haussdorff distance between these two sets of points, as well as their (weighted) average Haussdorff distance [79]:

$$Hauss = \max\left(\max_m\left(\min_n(\|Q_m^i - \bar{Q}_n^i\|)\right), \max_n\left(\min_m(\|Q_m^i - \bar{Q}_n^i\|)\right)\right) \tag{5}$$

$$avHauss = \tag{6}$$

$$\frac{1}{2}\left(\sqrt{\frac{1}{N_e}\sum_m \min_n(\|Q_m^i - \bar{Q}_n^i\|^2)} + \sqrt{\frac{1}{N_{gt}}\sum_n \min_m(\|Q_m^i - \bar{Q}_n^i\|^2)}\right)$$

Figure 7:
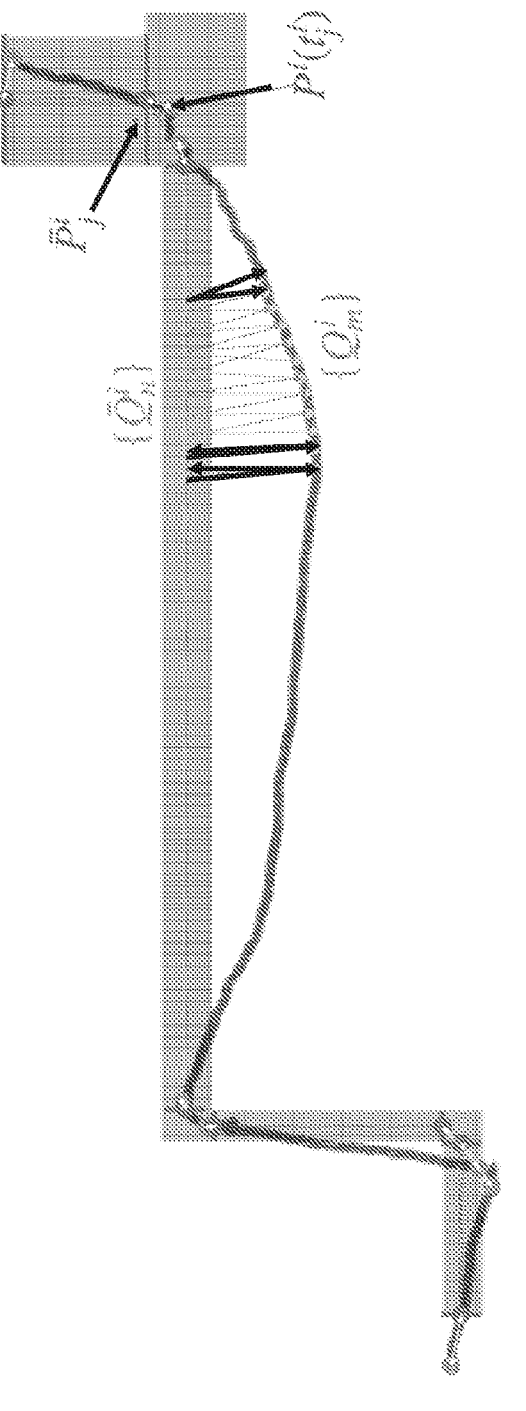

The Haussdorff distance penalizes any large (possibly episodic) discrepancy between the estimated trajectory and the ground truth. The average Haussdorff is a more lenient measure, that penalizes consistent biases. These two metrics allow us to evaluate the goodness of the estimated trajectory in its entirety (and not just at waypoints). FIG. 7 illustrates the three considered metrics.

6. Path Reconstruction

6.1 Map-Less Path Reconstruction

The following algorithms for map-less path reconstruction (see FIG. 8) were considered:

Azimuth/Steps (A/S): At each detected step, a displacement vector is defined with length equal to the step stride, and with orientation equal to the azimuth angle θ as provided by the phone;

45°-90° Turns/Steps (T/S): At each detected step, a displacement vector is defined with length equal to the step stride, and with orientation equal to the output of our two-stage 45° or 90° turn detection method;
RoNIN (R)—Fine-tuned RoNIN (FR).

Reconstruction errors are shown for the three considered metrics in Table 3. Note that fine-tuned RoNIN was only considered for blind walkers (LC and DG). Examples of map-less path reconstruction using fine-tuned RoNIN, Azimuth/Steps, and 90° Turns/Steps, are shown in FIG. 9. Although the reconstruction errors are computed after alignment as described in Section 4.4.1, the paths have been re-aligned on the underlying map in the FIG. for easy comparison with the map-assisted reconstructed paths.

the desired output for sighted walkers (possibly due to their more regular gait) than for blind walkers. The average stride lengths learnt within-community are also larger for sighted walkers (0.74 m) than for dog guide users (0.62 m) or long cane users (0.55 m). This is not surprising considering that, in general, dog guide users walk faster and more confidently than long cane users, as they do not need to probe the space ahead with the cane and can rely on their dog guide to lead them along a safe trajectory. Comparison with [16], which also presents results for various step counting algorithms as applied to WeAllWalk, shows that use of a LSTM leads to improved results. For example, the lowest value for SC-Error 1 (measured as the sum of UC and OC rates) for long cane users was found to be 7.8% in [16] (vs. 6.5% with our

TABLE 3

Reconstruction errors ($RMSE_{wp}$, Hauss, avHauss) using the mapless path reconstruction algorithms described in Section 4.4.2. Units of meters. For each community of walkers (S, LC, DG), the smallest error values for each metric are shown in boldface.

|  | A/S | | | 45° T/S | | | 90° T/S | | | R | | | FR | | |
|---|---|---|---|---|---|---|---|---|---|---|---|---|---|---|---|
| TS:LC | 9.43 | 14.68 | 4.90 | 9.17 | 14.48 | 4.70 | 9.03 | 13.90 | 4.63 | 5.43 | 8.56 | 2.93 | — | — | — |
| TS:DG | 5.81 | 8.97 | 3.30 | 5.64 | 8.67 | 2.82 | 4.94 | 7.50 | 2.75 | 5.66 | 8.55 | 2.84 | — | — | — |
| TC:S | 4.45 | 7.06 | 2.39 | 3.96 | 6.12 | 1.89 | 3.93 | 5.97 | 1.88 | 4.26 | 6.75 | 2.39 | — | — | — |
| TC:LC | 3.85 | 6.21 | 2.30 | 3.86 | 6.45 | 2.22 | 3.46 | 5.47 | 1.97 | 5.43 | 8.56 | 2.93 | 4.36 | 7.37 | 2.54 |
| TC:DG | 6.38 | 9.90 | 3.29 | 6.28 | 9.86 | 2.92 | 6.13 | 9.60 | 2.92 | 5.66 | 8.55 | 2.84 | 6.80 | 10.42 | 3.29 |
| TA:LC | 6.29 | 10.27 | 3.60 | 5.99 | 9.79 | 3.32 | 5.88 | 9.47 | 3.31 | 5.43 | 8.56 | 2.93 | 6.18 | 9.90 | 3.27 |
| TA:DG | 5.21 | 8.37 | 2.88 | 5.00 | 8.18 | 2.52 | 4.59 | 7.64 | 2.50 | 5.66 | 8.55 | 2.84 | 5.17 | 8.08 | 2.50 |

6.2 Map-Assisted Path Reconstruction

The particle filter was fed with data generated by three different algorithms: Azimuth/Steps (A/S), RoNIN, and, for blind walkers, fine-tuned RoNIN. The Turns/Steps algorithm was shown to give comparatively poor results in this case. Table 4 shows the results, for the three metrics considered, using particle filtering (PF), as well as particle filtering with mean shift mode selection in the "instantaneous" mode (PF-MS) and in the "global" mode (PF-MS-G; see Section 3.4). Sample reconstructed paths are shown in FIG. 9.

7. Example Results

7.1. Step Counting Results

The data in Table 1 and the curves in FIG. 6 clearly show how step counting accuracy is affected by the community of walkers used to train the system. For example, when testing with long cane users a step counter trained on sighted walkers (TS:LC), the sum of undercount and overcount rates was found to be 13.09% (SC-Error 1) or 8.33% (SC-Error 2). However, when the system was trained only with other long cane users (TC:LC), these numbers reduce to 6.49% and 1.87%, respectively. Similar observations can be drawn from the tests with dog guide users, for whom the best results were obtained when training on all available data (TA:DG). A possible cause for the worse performance of TC:DG with respect to TA:DG is the small number of dog guide users in WeAllWalk (only two users in the training set of each cross-validation round). The average threshold S on the output of the LSTM as learned from within-community training data is substantially larger for sighted walkers (0.78) than for dog guide (0.68) or long cane users (0.55). Larger thresholds should be expected when the output of the LSTM is closer to the binary signal used to indicate heel strikes. This suggests that the LSTM is better capable of modeling system, see Table 1). For the same community of users, the minimum SC-Error 2 found in [16] was 4.8%, vs. 1.9% with our system.

Table 4 (see FIG. 14). Reconstruction errors (RMSEwp, Hauss, avHauss) using the map-assisted path reconstruction algorithms described in Section 5. Units of meters. For each community of walkers (S, LC, DG), the smallest error values for each metric are shown in boldface.

7.2. Turn Detection Results

Remarkably, Table 2 shows no undercounts or overcounts for sighted walkers (TC:S). This suggests that these participants tended to walk on straight lines, without large sway patterns that could generate false positives. Errors were generally higher for the 45° than for the 90° turn detectors. These results should be evaluated keeping in mind that even a single missed turn, or a single false positive, could potentially lead to large path reconstruction errors. For long cane users, training with all available data (TA:LC) gave substantially better results than training only with data from sighted walkers (TS:LC). No such large discrepancies across training modalities were observed when testing with dog guide users, for whom the best results were obtained for within-community training (TC:DG). These results are vastly superior than those observed in [16], where turns were computed on WeAllWalk data using the algorithm described in [38]. In that case, the accumulated error (UC rate+OC rate) 90° TD-Error was found to exceed 50%.

7.3. Map-less Path Reconstruction Results

The data in Table 3 shows that the smallest reconstruction errors were measured for the 90° Turns/Steps algorithm (although for dog guide users, a similar small error for the avHuass metric was obtained with fine-tuned RoNIN). The 45° Turns/Steps algorithm performed only marginally worse than the 90° case. Remarkably, the best training modality for long cane users (within-community training, TC:LC), gives similar error as the best case for sighted walkers. However, when testing with long cane user using a system trained with sighted walkers, very poor results were obtained. For example, the RMSEwp error for the 90° Turns/Steps system, which is 3.46 m for within-community training (TC:LC), jumps to 9.03 m when training on sighted walkers (TS:LC). For dog guide users, the best results were obtained by training over all available data. Both RoNIN and the simpler Azimuth/Steps algorithms are affected by drift, and produced comparable results.

One notable exception is for long cane users when the system was trained with sighted walkers (TS:LC). In this case, RoNIN gave substantially better results than all other methods (though still worse than TC:LC). A likely reason for this can be found in the different average stride length between sighted and long cane users (see Section 7.1), which may cause incorrect reconstructed path lengths for TS:LC. RoNIN, which does not rely on stride lengths, may provide more accurate velocity measurements in this case. The data also shows that fine-tuning the RoNIN network did not result in improved path reconstruction performance.

7.4. Map-assisted Path Reconstruction Results

The best results for the community of blind walkers were obtained with the azimuth/steps (A/S) algorithm, processed by the PF-MS-G filter. For the sighted walkers, the best results were obtained with RoNIN, still processed by PF-MS-G, although these last results were only marginally better than using the A/S algorithm. It appears that the strong wall impenetrability constraint was able to limit the effect of azimuth drift. In general, errors for map-assisted reconstruction were substantially lower than for the map-less case. As in the prior cases, training the system over sighted walkers was shown to give poor results when tested with long cane users and, to a lesser extent, with dog guide users. Although the best results were obtained with the PF-MS-G algorithm, use of the mean shift clustering was not shown to give consistently better results overall.

Figure 9B:
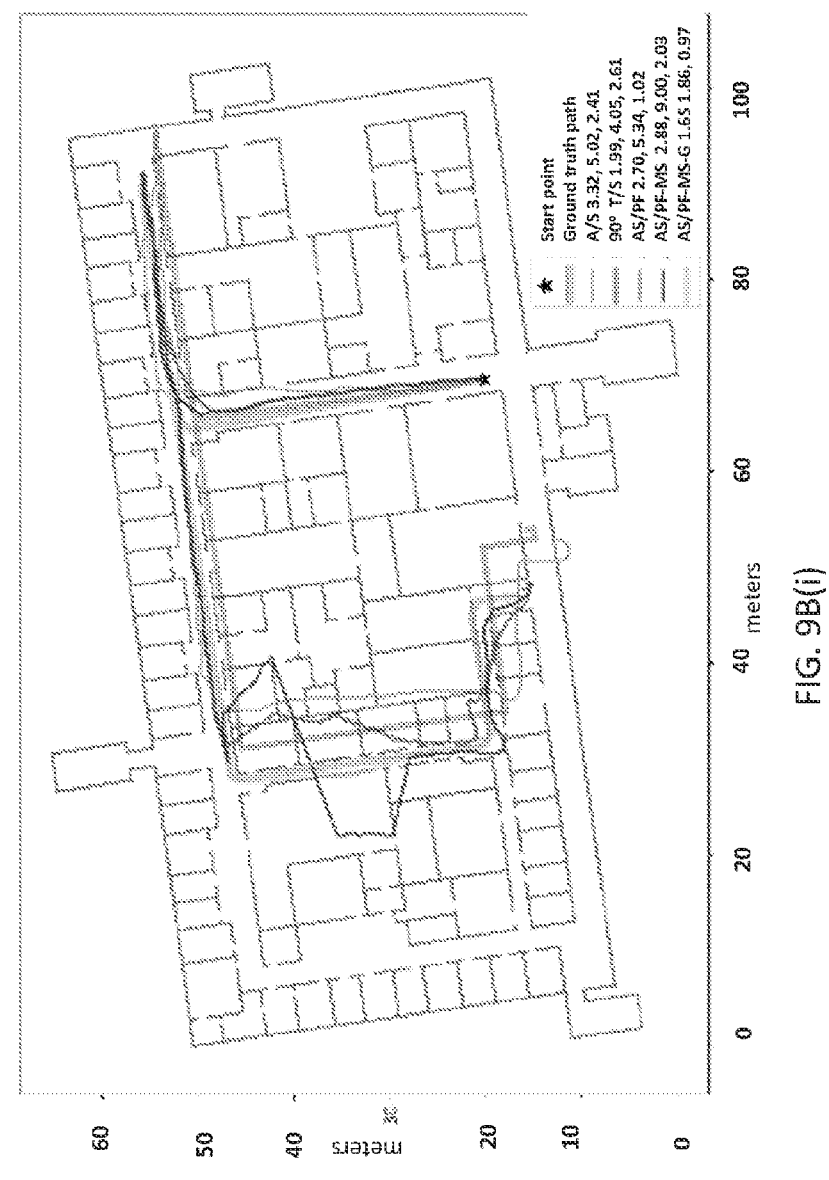
Figure 9C:
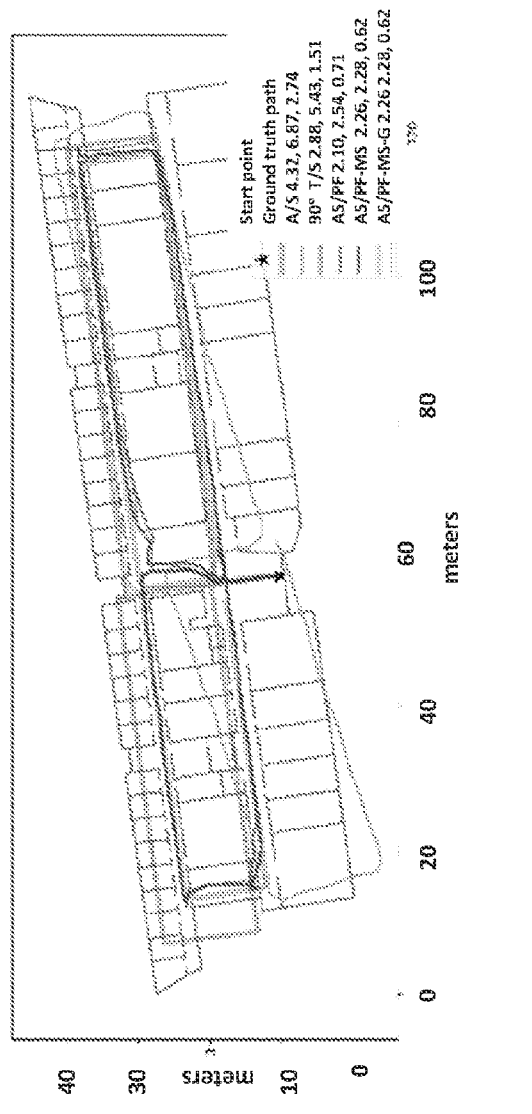

FIG. 9 provides some insight into the behavior of the reconstruction algorithms. In (A), both original paths (A/S, fine-tuned RoNIN) were grossly incorrect due to orientation drift. Particle filtering tracked and removed drift, and correctly reconstructed the paths. In the case of FIG. 9B, poor velocity estimation led to reconstructed segments that were too short (Azimuth/Steps) or too long (fine-tuned RoNIN). In both cases, particle filtering found incorrect paths through open doors. PF-MF-G was able to correctly reconstruct most of the path for the Azimuth/Steps case, but not for the fine-tuned RoNIN case. The trajectory in output of either system in the case of FIG. 9C was affected by both drift and incorrect velocity estimation. Although particle filtering was for the most part able to successfully correct the trajectory in the Azimuth/Steps case, it produced a poor reconstruction for fine-tuned RoNIN.

We note that the set of path reconstruction algorithms considered in this work includes inertial-based odometry algorithms used in research for blind walkers. For example, [68] used a PDR-based on step counting coupled with orientation, while [67] additionally implemented a particle filter.

7.5 Voice Assisted Navigation

For the map-less case, in which the strong constraint of wall impassibility cannot be relied on, a simple turn or segment path representation was attempted. This is appropriate for buildings with corridors that intersect at discrete turning angles at multiples of 45° or 90°. Besides providing a strong spatial prior which can be used to compensate for drift, this representation is particularly useful for the verbal description of a path. As an example, a path could be represented as "walk straight for 80 steps, then make a right turn, walk straight for 50 more steps, make a left turn, then after 40 steps you will reach your destination". It is important to note that for a turn or segment representation to be successful, turns must be detected robustly, which may be challenging in some situations. For example, a blind walker may stop and turn around to get their bearings, or to listen to a sound that may help with orientation, something that could mistakenly be interpreted by the system as a path turn [18]. In one or more embodiments, such turns are disregarded by the system because the machine learning algorithm determining straight sections and the turn detector are trained to disregard turns that are not between consecutive straight sections.

8. Advantages and Improvements

The present disclosure includes a detailed study on the use of two odometry systems: a PDR based on step counts and orientation estimation, and a deep learning algorithm (RoNIN), to reconstruct paths taken by blind walkers using a long cane or a dog guide, as represented in the WeAllWalk dataset. For the map-less case, a two-stage system capable of robustly detecting turns (e.g., at multiples of 45° or 90° degrees) combined with an RNN-based step counter with learned fixed stride length was introduced. For the map-assisted case, a standard particle filtering algorithm and a posterior distribution mode identification module were employed. Compared with work that explored inertial odometry for use by blind pedestrians (e.g., [18,67,68]), the disclosed study includes a variety of algorithms for both the map-assisted and map-less case, and reports the results of extensive quantitative evaluations using appropriate metrics on a representative data set with blind walkers (WeAllWalk). Although it is possible that other sensing modalities (e.g., visual odometry [63] or BLE-based positioning [65]) may achieve higher localization accuracy, inertial odometry has clear practical advantages, as it requires no additional infrastructure, and may function even if the user keeps the smartphone in their pocket while walking.

These Examples have shown that, for the same algorithm, the choice of the community of walkers used for training the algorithm's parameters is important. Systems trained with sighted walkers consistently gave poor results when tested with long cane users and, to a lesser extent, with dog guide users. However, when the training set contained data collected from these communities, results improved substantially, and were in fact comparable to the best results obtained when testing with sighted walkers. Our results also showed that our Turns/Steps PDR produced better results than the more sophisticated RoNIN in the map-less case, even when the latter was fine-tuned to better model walking patterns of blind individuals. For the map-assisted case, the best results were found when the particle filter was fed with data from the Azimuth/Steps algorithm. It should be noted, however, that participants in WeAllWalk kept their smartphones in a fixed location on their garments. Had they changed the orientation of their phone (e.g., to pick up a call, or by repositioning the phone in a different pocket), it is likely that this change in phone orientation would have negatively affected the results. In these situations, an algorithm such as RoNIN, which was trained to correctly identify the user velocity independently of the phone orientation, possibly combined with a mechanism to reduce the effect of drift, could provide more robust position tracking.

The choice of the minimum turn angle for a Turn/Steps PDR depends on the specific environment considered. Although the layout of most buildings results from corridor networks intersecting at 45° or 90° degrees, there may be situations that call for a finer angular interval. This could be achieved by increasing the cardinality of the state tracked by the MKF (Section 2.2). Mitigation procedures similar to those described herein could be used to reduce the detection of false positives resulting from the finer angular resolution.

A main technical problem in the art that may be overcome using example systems described herein is that of "orientation drift", in which the orientation of the walker as an error that increases with time, due to bias in the gyro data. Embodiments of the present invention also correct for biases in path length estimation, enables more accurate pedestrian tracking, and can be customized to particular types of walkers (e.g., blind people walking with the help of a long cane)

Hardware Environment

FIG. 10 is an exemplary hardware and software environment 1000 (referred to as a computer-implemented system and/or computer-implemented method) used to implement one or more embodiments of the invention. The hardware and software environment includes a computer 1002 and may include peripherals. Computer 1002 may be a user/client computer, server computer, or may be a database computer. The computer 1002 comprises a hardware processor 1004A and/or a special purpose hardware processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028. In one or more embodiments, computer 1002 may be coupled to, or may comprise, a portable or media viewing/listening device 1032 (e.g., an MP3 player, IPOD, NOOK, portable digital video player, cellular device, personal digital assistant, etc.). In yet another embodiment, the computer 1002 may comprise a multi-touch device, mobile phone, gaming system, internet enabled television, television set top box, or other internet enabled device executing on various platforms and operating systems.

In one embodiment, the computer 1002 operates by the hardware processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results.

Output/results may be presented on the display 1022 or provided to another device for presentation or further processing or action. In one embodiment, the display 1022 comprises a liquid crystal display (LCD) having a plurality of separately addressable liquid crystals. Alternatively, the display 1022 may comprise a light emitting diode (LED) display having clusters of red, green and blue diodes driven together to form full-color pixels. Each liquid crystal or pixel of the display 1022 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC) or field programmable gate array.

The computer 1002 may also implement a compiler 1012 that allows an application or computer program 1010 written in a programming language such as C, C++, Assembly, SQL, PYTHON, PROLOG, MATLAB, RUBY, RAILS, HASKELL, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention (e.g., turn detector, step detector, machine learning, neural networks) or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1002.

FIG. 11 schematically illustrates a typical distributed/cloud-based computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Further, in a cloud-based computing system, resources (e.g., storage, processors, applications, memory, infrastructure, etc.) in clients 1102 and server computers 1106 may be shared by clients 1102, server computers 1106, and users across one or more networks. Resources may be shared by multiple users and can be dynamically reallocated per demand. In this regard, cloud computing may be referred to as a model for enabling access to a shared pool of configurable computing resources.

Clients 1102 may execute a client application or web browser and communicate with server computers 1106 executing web servers 1110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1102 may be downloaded from server computer 1106 to client computers 1102 and installed as a plug-in or ACTIVEX control of a web browser. Accordingly, clients 1102 may utilize ACTIVEX components/component object model (COM) or distributed COM (DCOM) components to provide a user interface on a display of client 1102. The web server 1110 is typically a program such as MICROSOFT'S INTERNET INFORMATION SERVER.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S TRANSACTION SERVER (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1102 and 1106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1102 and 1106. Embodiments of the invention are implemented as a software/application on a client 1102 or server computer 1106. Further, as described above, the client 1102 or server computer 1106 may comprise a thin client device or a portable device that has a multi-touch-based display.

In one or more examples, the one or more processors, memories, and/or computer executable instructions are specially designed, configured or programmed for performing machine learning. The computer program instructions may include a detection/pattern matching component for pattern recognition or detection (e.g., straight section recognition/detection, turn detection, trajectory identification) or applying a machine learning model (e.g., for analyzing data or training data input from a data store to perform machine learning algorithms described herein). In one or more examples, the processors may comprise a logical circuit for performing pattern matching or recognition, or for applying a machine learning model for analyzing data or train data input from a memory/data store or other device. Data store/memory may include a database, e.g., storing various training sets.

In some examples, the pattern matching model applied by the pattern matching logical circuit may be a machine learning model, such as a convolutional neural network, a logistic regression, a decision tree, recurrent neural network, or other machine learning model. In one or more examples, the logical circuit comprises a straight section circuit, a turn detector circuit, and/or a trajectory reconstruction logical circuit.

Process Steps

Method for Tracking

FIG. 12 is a flowchart illustrating a computer implemented method for determining a user's trajectory.

Block 1200 represents receiving input data, comprising acceleration in 3 orthogonal directions, orientation data (including azimuth angle), and rotation rate in the three orthogonal directions, from one or more inertial sensors carried by a user taking steps comprising heel strikes along a trajectory.

Block 1202 represents transforming the input data. In one or more examples, the step comprises transforming coordinates of the input data into a heading agnostic reference frame, to obtain heading agnostic data.

Block 1204 represents identifying turns. The step comprises analyzing the input data using a first trained machine learning algorithm so as to detect a plurality of n straight sections when the user is walking along an approximately straight path; implementing an orientation tracker tracking an orientation of the user in each of the n straight sections, wherein the orientation comprises an estimated orientation taking into account drift of the input data outputted from the one or more sensors; implementing a turn detector detecting each of the turns, wherein each of the turns is a change in the estimated orientation of the user in the $n^{th}$ straight section as compared to the estimated orientation in the $(n-1)^{th}$ straight section.

Block 1206 represents using a second trained machine learning algorithm to detect the steps by associating impulses in the heading agnostic data with the heel strikes.

Block 1208 represents counting a number of the detected steps by associating the steps with a stride length, so as to output step data.

Block 1210 represents optionally associating the step data and turns with a map.

Block 1212 optionally performing particle filtering.

Block 1214 represents determining the trajectory using the step data and the turns.

Method of Making and Training

FIG. 13 illustrates a method of training machine learning algorithms to count steps, detect turns, and construct a path or trajectory so as to obtain a computer implemented system useful for determining a user's trajectory.

Block 1300 represents obtaining one or more processors; one or more memories; and one or more computer executable instructions stored in the one or more memories, wherein the computer executable instructions are executed by the one or more processors. The computer executable instructions implement the machine learning algorithms as described herein.

Block 1302 illustrates receiving or creating, in the computer, training data comprising ground truth data comprising ground truth step data (e.g., number of steps) and ground truth turn data (e.g., number and location of turns). In one or more examples, the training data comprises WeAllWalk data.

Blocks 1304A-1304B represents training:

(1) the first machine learning algorithm (Block 1304A), using the ground truth turn data, to detect the turns using the acceleration and orientation data. In one or more examples, the training comprises using one or more error metrics (e.g., the Loewenstein metric) to compare the turn data determined from the first machine learning algorithm, with the ground truth turn data. In one or more examples, the first machine learning algorithm is trained to detect the 90 degree turns by not including the turns comprising 45 degree turns or 90 degree turns associated with a 45 degree turn. In yet further examples, training the first machine learning algorithm to detect 45 degree turns comprises converting 90 degree turns into two consecutive 45 degree turns.

(2) the second machine learning algorithm (Block 1304B), using the ground truth step data, to count the steps using the acceleration and rotation rate data obtained from the inertial sensors (e.g., on a smart phone). In one or more examples, the training comprises using one or more error metrics to compare the step data determined from the second machine learning algorithm, with the ground truth step data.

Block 1306 represents optionally training a third machine learning algorithm, using ground truth training data comprising waypoint time stamps, to track the trajectory of the user using the step data and the turn data determined from the acceleration and rotation rate data (e.g., outputted from inertial sensors on a smartphone). In one or more examples, the training comprises using an error metric to compare a degree of alignment of the trajectory determined by the third machine algorithm with a ground truth path passing through the waypoint time stamps. In one or more examples, the training data comprises WeAllWalk data.

Block 1308 represents a computer implemented system implementing trained machine learning algorithms or artificial intelligence. In one or more examples, the step further comprises coupling the system to a navigation system and a smartphone.

Illustrative examples of the system include, but are not limited to, the following (referring to FIGS. 1-15).

1. FIG. 3, 8, 9, 10, 15 illustrates an example computer implemented system 1000 useful for determining turns in a user's trajectory 800, comprising:

one or more processors 1004; one or more memories 1006; and one or more programs stored in the one or more memories, wherein the one or more programs 1010 executed by the one or more processors:

receive input data, comprising orientation data and acceleration from one or more sensors carried by a user 306 taking steps along a trajectory;

analyze the input data 204 using a first trained machine learning algorithm 1500 or straight walking detector 202 so as to detect a plurality of n straight sections 802 when the user is walking along an approximately straight path;

comprise an orientation tracker 200 tracking an orientation of the user in each of the n straight sections, wherein the orientation comprises an estimated orientation taking into account drift of the input data outputted from the one or more sensors; and comprise a turn detector 1500, 850 detecting each of the turns 804, wherein each of the turns is a change in the estimated orientation of the user in the $n^{th}$ straight section 802a as compared to the estimated orientation in the $(n-1)^{tph}$ straight section 802b (e.g., orientation is azimuth angle θ or angle in degrees between the $n^{th}$ straight section and the (n-1)th straight section, where n is an integer).

2. The system of example 1, wherein the one or more programs output a trajectory of the user using the one or more turns detected by the turn detector.

3. The system of examples 1 or 2, wherein:

the first trained machine learning algorithm comprises a recurrent neural network 1500 trained to identify, from the acceleration and the orientation data comprising azimuthal angle, one or more time intervals during which the user walks regularly on a straight path.

4. FIG. 3 illustrates an example of the system of any of the examples 1-3, wherein the first trained machine learning algorithm 1500 is trained to disregard changes in the orientation resulting from the user comprising a visually impaired user stopping and rotating their body for re-orientation purposes, swerving to avoid a perceived obstacle, or mistakenly veering off a straight path.

5. The system of any of the examples 1-4, wherein the orientation tracker:

assigns the orientation data comprising an azimuthal angle $\theta(t)$ at each time t to one of N fixed orientations $$\{O^k(t) = k \cdot 360°/N\},$$

to form a sequence of orientations, models the sequence of the orientations $O^k$ as a Markov chain;

models a drift $d(t)$ in the $\theta(t)$ as a random walk with additional Gaussian white noise;

uses a Mixture Kalman Filter (MKF) algorithm to compute a posterior distribution of discrete orientations $P(O^k(t)|\theta(1:t))$ and of drift $p(d(t)|\theta(1:t))$ at each time, where $$p(\theta(t) \mid O(t), d(t), \theta(1{:}t-1)) = p(\theta(t) \mid O(t), d(t)) = N(O(t) + d(t), \sigma_\theta^2)$$

$$p(d(t) \mid d(t-1), \theta(1{:}t-1)) = p(d(t) \mid d(t-1)) = N(d(t-1), \sigma_d^2)$$

$$P(O^k(t) \mid O^m(t-1), \theta(1{:}t-1)) =$$

$$P(O^k(t) \mid O^m(t-1)) = \begin{cases} q, & m = k \\ (1-q)/2, & |m-k| = 1 \\ 0, & \text{otherwise} \end{cases}$$

$\theta(1{:}t-1)$ represents a sequence of measurements of the azimuth angle before time t $N(\mu, \sigma^2)$ is a normal distribution;

q represents the prior probability that the user's orientation does not change in two consecutive time instants;

wherein the MKF algorithm forms the posterior distribution comprising a list of a plurality of the sequences of the orientations, a Kalman filter is associated with each of the sequences; and the MKF algorithm adds, at each time instant, a new orientation to the sequence by sampling from the posterior distribution $P(O(t)|\theta(1:t))$; and the one or more programs assign the estimated orientation at time t as the maximizer of $P(O(t)|\theta(1:t))$.

6. The system of example 5, wherein:

the parameters $\sigma_\theta$, $\sigma_d$, and q are learned from training data by finding a minimum of a weighted sum of an overcount rate and an undercount rate of the turns, giving larger weight to the undercount rate.

7. The system of any of the examples 5-6, wherein N=8 or 4 (orientations at multiples of 45° or 90°, respectively) and a turn by 90° is tracked as two consecutive turns by 45°.

8. FIG. 3 illustrates an example of the system of any of the examples 1-7, wherein portions at the beginning and end of each straight section 802 when the user 306 is known to be standing still are labeled, during training of the first machine learning algorithm, as non-straight walking sections 304.

9. The system of any of the examples 1-8, wherein first machine learning algorithm 1500 identifies each of the straight walking sections 302 after sampling the orientation data for no more than 1 second.

10. The system of any of the examples 1-9, wherein the orientation tracker 200 mitigates for tracking delays causing detection of the turns 804 during the straight sections 802, by comparing the mode of the orientation in the $n^{th}$ straight section 802a with mode of the orientation in $(n-1)^{ro}$ straight section 802b.

Figure 1A:
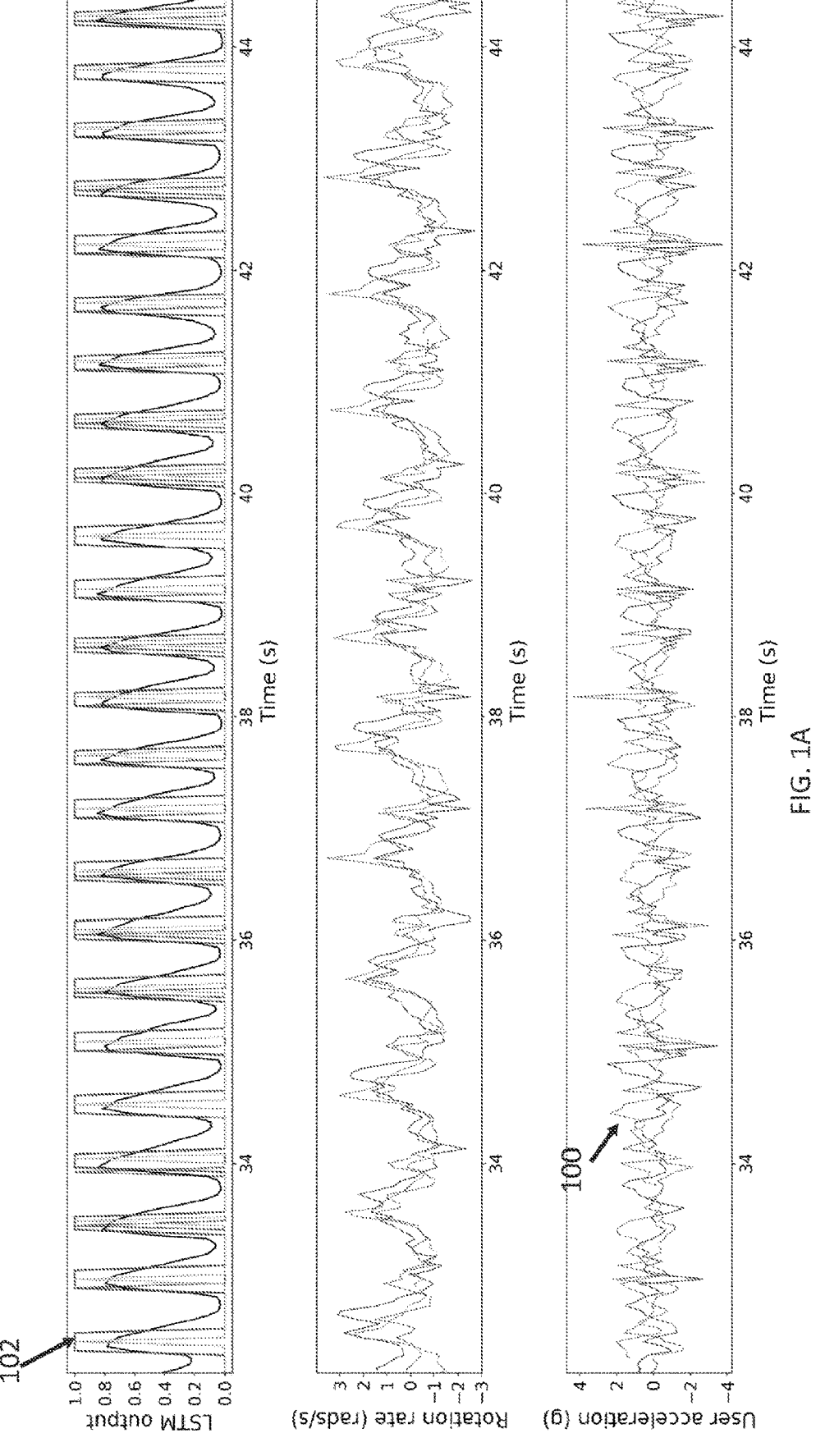
(FIG. 1A) Top row: the output of (Long Short-Term Memory) (LSTM) (black line) neural network is thresholded, and the midpoints of the resulting positive segments (gray line) are taken as the estimated times of heel strike (ground-truth shown by red line). The LSTM takes in input the 3-axes rotation rate (middle row) and the 3-axes user acceleration (bottom row). Examples of overcounts are seen in (FIG. 1B) between t=24 s and t=26 s. An example of undercount is seen between t=29 s and t=30 s.

11. FIG. 1A and FIG. 8 further illustrates an example of the system of any of the examples 1-10, wherein:

the input data comprises the acceleration in three orthogonal directions (e.g., x, y and z cartesian directions) and rotation rate (e.g., about the x, y, or z axis) in the three orthogonal directions, and the steps comprise heel strikes along the trajectory, and one or more of the programs:

transform coordinates of the input data 204 into a heading agnostic reference frame, to obtain heading agnostic data;

use a second trained machine learning algorithm 1500 to detect the steps 806 by associating impulses 100 in the heading agnostic data with the heel strikes;

count a number of the detected steps 806 by associating the steps with a stride length 808, so as to output step data 102; and determine the trajectory using steps detected using the second trained machine learning algorithm and the turns detected using the turn detector.

12. The system of example 11, wherein the trajectory comprises:

one or more step displacement vectors 810 defined at each of the detected steps as having a length equal to the stride length and a direction comprising an azimuthal angle obtained from the input data; and one or more turn displacement vectors 812 defined as having a length equal to the stride length and with the direction determined from the turn data.

13. FIG. 8 illustrates an example of the system of example 12, wherein the one or more programs determine or track the trajectory by comparing and aligning the step data and the turns with trajectory data 814 outputted from another machine learning algorithm (e.g., Ronin neural network) analyzing or determining or tracking the user's trajectory.

14. The system of any of the examples 1-13, wherein the trajectory is determined without reference to a map of the environment in which the user is moving.

15. FIG. 5 illustrates an example of the system of any of the examples 1-13, wherein the one or more programs:

receive a map 500 of an environment in which the user is moving, the map identifying one or more impenetrable walls 502, and determine the trajectory by comparing the trajectory to the map and eliminating one or more paths 504 from a trajectory that traverses the impenetrable walls.

16. The system of example 15, wherein the one or more programs:

receive or obtain velocity vectors of the user from the input data or another source;

apply a particle filtering algorithm to the velocity vectors to output posterior locations of the user; and apply a mean shift algorithm to the posterior locations to estimate locations of the user as the highest modes of the posterior locations.

17. The system of example 16, wherein the trajectory is determined by linking pairs of the estimated locations that share the largest number of modes.

18. The system of any of the examples 1-17, wherein the machine learning algorithms are trained using training data comprising the acceleration, orientation data, and the rotation rate of the users comprising blind or visually impaired persons using walking aids (e.g., a cane or a dog).

19. The system of any of the examples 1-18, further comprising:

the first trained machine learning algorithm 1500 trained:
   using the ground truth data comprising ground truth turn data and one or more first error metrics comparing the turns determined from the first trained machine learning algorithm with the ground truth turn data;
   to detect the turns 804 comprising 90 degree turns using training data not including the turns 804 comprising 45 degree turns or 90 degree turns associated with a 45 degree turn; and
   to detect the turns comprising (804) 45 degree turns using the training data wherein 90 degree turns are converted into the turns comprising two consecutive 45 degree turns;

the second trained machine learning algorithm 1500 trained using ground truth data comprising ground truth step data and one or more second error metrics comparing the step data determined from the second trained machine learning algorithm with the ground truth step data.

20. The system of example 19, wherein the first error metric for the turns utilizes the Ellenstein distance.

21. The system of any of the examples 1-21, further comprising the one or more programs determining the trajectory using a third trained machine learning algorithm 1500 trained using ground truth data comprising waypoint time stamps and one or more error metrics, the one or more error metrics comparing a degree of alignment of the trajectory with a ground truth path passing through the waypoint time stamps.

22. The system of any of the examples 1-21, wherein the machine learning algorithms 1500 are trained using WeAllWalk data.

23. The system of any of the examples 1-22, wherein the second trained machine learning algorithm 1500 utilizes an LSTM (Long Short Term Memory) neural network comprising no more than 2 layers and a hidden unit size of no more than 6.

24 The system of any of the examples 1-23, wherein the first trained machine learning network utilizes a GRU (Gated Recurrent Unit) neural network.

25. The system of any of the examples 1-24, wherein the machine learning is trained for the user walking indoors.

27. A navigation system comprising the system of any of the examples 1-26.

28. FIG. 8 and FIG. 10 illustrates a navigation system 1000 determining turns in a user's trajectory, comprising:

a smartphone 1032 comprising a display 1022 and one or more sensors 1030 and at least comprising or coupled to one or more processors 1004A, 1004B; one or more memories 1006; and one or more programs 1010 stored in the one or more memories, wherein the one or more programs executed by the one or more processors:

receive input data X, 204, comprising orientation data and acceleration from the one or more sensors carried by a user taking steps along a trajectory 800;

detect a plurality of n straight sections 802 in the trajectory, where n is an integer, each of the straight sections corresponding to the user 306 walking along a substantially straight or linear path;

generate and track an orientation (azimuth $\theta$) of the user in each of the n straight sections 802, wherein the orientation comprises an estimated orientation taking into account drift of the input data 204 outputted from the one or more sensors;

detect one or more turns 804 in the trajectory, wherein each of the turns 804 is a change in the estimated orientation of the user in the $n^{th}$ one of the straight sections 802a as compared to the estimated orientation in the $(n-1)^{th}$ one of the straight sections 802b; and outputting, to the display 1022, a graphical representation 801 of the trajectory 800 generated using the one or more turns 804.

29. FIG. 3 and FIG. 11 illustrate an example of the system of example 28, wherein detecting the straight sections 802 further comprises the one or more programs:

storing the input data in a database 1116;

transforming the input data into trajectory detection data (e.g., vectors, feature vectors X) processable by a first machine learning module 1500;

classifying the trajectory detection data as representing motion in one of the straight sections 802, 302 (SW) or in a non-straight section (non-SW) 304 using the first machine learning module 1500; and at least labelling one or more values of the trajectory detection data X in a database 1116 as being associated with one of the straight sections 802 or indicating the one of the straight sections on the graphical representation 801 on the display 1022 if the one or more values are classified by the first machine learning module 1500 as being associated with the one of the straight sections 802.

30. The system of example 29, wherein the first machine learning module 1500 is trained using training data (input data X) comprising at least WeAllWalk data, or the acceleration and the orientation of, pedestrians 306 comprising blind or visually impaired persons walking using a walking aid.

31 The system of example 29 or 30, wherein the first machine learning module comprises a GRU neural network.

32. The system of example 29 or 30, wherein:

the classifying identifies or detects the plurality of straight sections 802 based on whether the vectors lie or are mapped to a first side or a second side of a hyperplane in a coordinate space of the vectors, the hyperplane determined using training reference data in a training database, the reference data comprising reference vectors associated with acceleration and orientation angle labeled during training of the first machine learning module as being associated with plurality of stored straight trajectories on the first side or non-straight trajectories on the second side; and the one or more programs label the one or more values of the input data in the database or indicate the one of the straight sections on the graphical representation on the display if the one or more of the vectors associated with the one or more values or straight sections are mapped by the first machine learning module to the first side of the hyperplane.

33. FIG. 15 and FIG. 3 illustrate an example of the system of any of the examples 29-32 wherein the first machine learning module comprises a recurrent neural network 1500 trained to identify, from the acceleration and the orientation data 204 comprising an azimuthal angle, each of the straight sections 802 comprising one or more time intervals during which the user 306 walks regularly or substantially on a straight path.

34. FIG. 3 and FIG. 15 illustrate an example of the system of any of the examples 29-33, wherein the first machine learning module 1500 is trained to disregard changes in the orientation θ resulting from the user 306 comprising a visually impaired user stopping and rotating their body to re-orient or swerving to avoid a perceived obstacle.

35. The system of any of the examples 28-34, further comprising detecting each of the straight sections 802 after the one or more programs sample the orientation data for no more than 1 second.

36. The system of any of the examples 28-35, wherein the turn 804 by an angle of 90° is tracked as two consecutive turns by 45°.

Figure 1B:
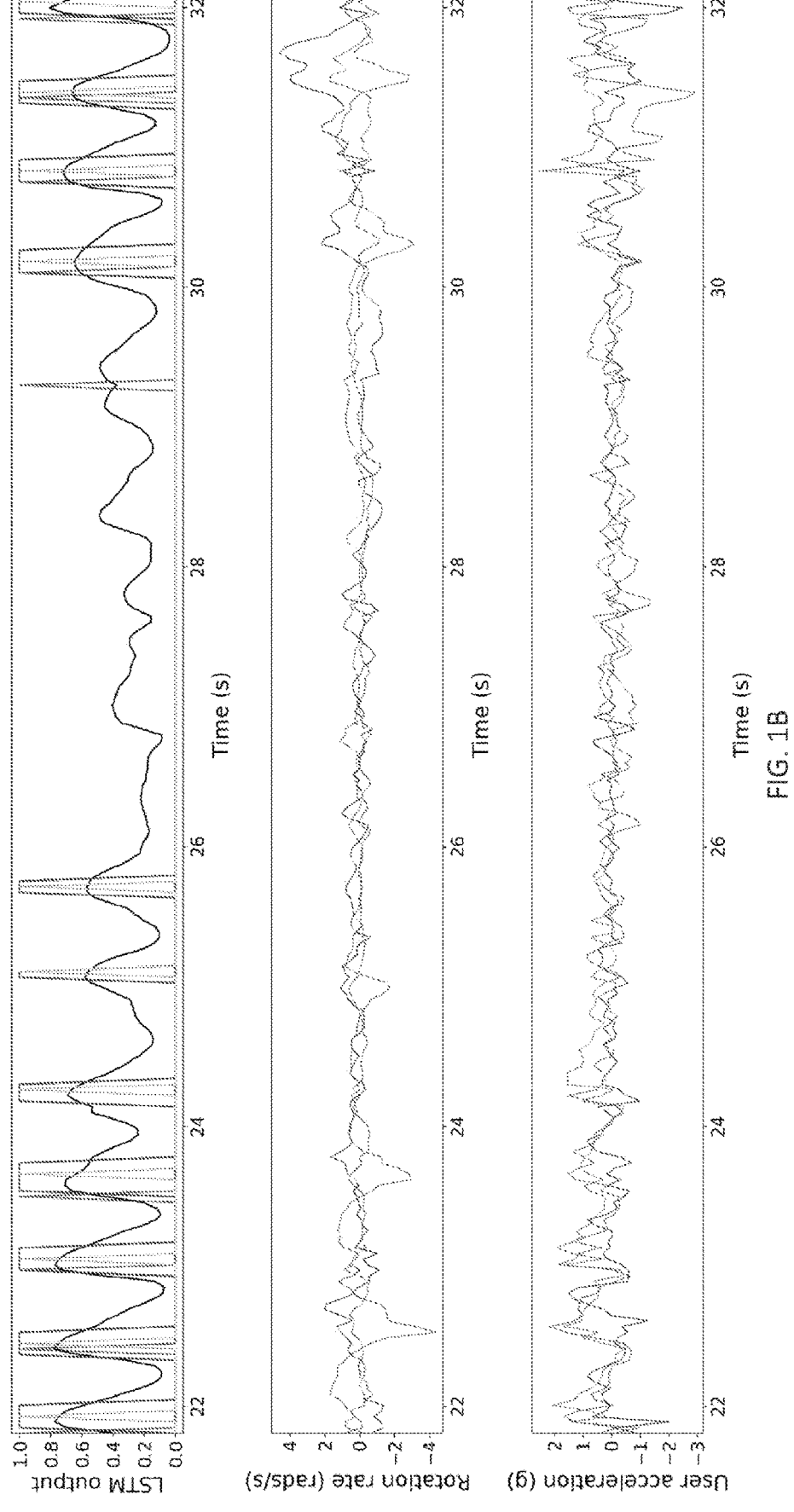
FIG. 1. Examples of step detection.

37. FIGS. 1A and 1B illustrate an example of the system of any of the examples 28-36, wherein the one or more programs:

transform coordinates of the input data into a heading agnostic reference frame, to obtain heading agnostic data X;

detect the steps 806 as detected steps by associating impulses 100 in the heading agnostic data with the heel strikes (of the user's 306 heel 308 on the ground) using a second machine learning module 1500;

count a number of the detected steps 806 by associating the steps with a stride length 808, so as to output step data 102;

determine the trajectory 800 using the detected steps 806 and the turns 804; and the trajectory comprises:

one or more step displacement vectors defined 810 at each of the detected steps as having a length equal to the stride length and a direction comprising an azimuthal angle θ obtained from the input data; and one or more turn displacement vectors 812 defined as having a length equal to the step stride and with the direction determined from the turns 804 detected by the turn detector.

38. The system of example 37, further comprising the one or more programs:

transform the heading agnostic data into trajectory detection data X processable by a second machine learning module 1500; and at least classify or recognize one or more values of the trajectory detection data as being associated with steps 806 using the second machine learning module, or count the steps 806 using the second machine learning module.

39. The system of example 37 or 38, wherein the second machine learning module 1500 is trained using reference trajectory data outputted from another machine learning module identifying the user's trajectory.

40. The system of any of the examples 37-39, wherein the second machine learning module comprises an LSTM neural network comprising no more than 2 layers 1502 and a hidden unit size of no more than 6.

41. The system of any of the examples 1-40, wherein the trajectory 800 is determined without reference to a map 500 of an environment in which the user is moving.

42. The system of any of examples 1-41, wherein the one or more programs:

receive a map 500 of an environment in which the user is moving, the map identifying one or more impenetrable walls 502, and determine the trajectory 800 by comparing the trajectory to the map and eliminating one or more paths 504 in a trajectory that traverses the impenetrable walls.

43. The system of example 42, wherein the one or more programs:

receive or obtain velocity vectors of the user 306 from the input data or another source;

generate posterior locations of the user from the velocity vectors using a particle filtering module; and generate a mean shift estimating locations of the user corresponding to the highest modes of the posterior locations; and generate the trajectory by linking pairs of the estimated locations that share the largest number of the modes.

44. FIG. 12 illustrates an example method for determining turns 804 and/or straight sections 802 in a user's 306 trajectory, comprising:

capturing input data 1200, 204 comprising orientation data and acceleration from one or more sensors carried by a user taking steps along a trajectory;

detecting 1204 a plurality of n straight sections 802 in the trajectory 800, each of the straight sections corresponding to the user 306 walking along a substantially straight path or a linear path;

generating and tracking an orientation of the user 306 in each of the n straight sections 802, wherein the orientation comprises an estimated orientation taking into account drift of the input data outputted from the one or more sensors; and detecting 1204 one or more turns 804 in the trajectory, wherein each of the turns 804 is a change in the estimated orientation of the user in the $n^{th}$ straight section 802a as compared to the estimated orientation in the $(n-1)^{th}$ straight section 802b.

45. The method of example 44, further comprising:

storing the input data 200 in a database 1116 on a computer 1000;

transforming 1202 the input data into trajectory detection data X processable by a first machine learning module 1500;

classifying 1204 the trajectory detection data as representing motion in one of the straight sections (SW) 302 or in a non-straight section (non-SW) 304 using the first machine learning module 1500; and at least labelling 1214 one or more values of the trajectory detection data in a database as being associated with one of the straight sections 802 or indicating the one of the straight sections 802 on the graphical representation on the display 1022 if the one or more values are classified by the first machine learning module 1500 as being associated with the one of the straight sections 802.

46. FIGS. 12 and 13 illustrates an example of the method of example 45 further comprising training the first machine learning module 1500 for detecting at least one of the straight sections 802 or turns in a trajectory 800, comprising:

collecting 1200 a set of first pedestrian data, the first pedestrian data comprising orientation data and acceleration data for a walking pedestrian 306;

applying 1202 one or more transformations to the first pedestrian data including smoothing to create a modified set of pedestrian data;

creating 1302 a first training set from the modified set, comprising labelled straight walking sections and labeled non-straight walking sections; and training 1304A the first neural network module in a first stage using the first training set to identify the straight sections in the trajectory data using the orientation data and the acceleration data, the straight sections each corresponding to the user walking along the linear path.

47. The method of example 46, wherein the first training set comprises the modified set comprising data for the pedestrians 306 comprising blind or visually impaired persons walking using a walking aid comprising at least one of a cane or a guide dog.

48. The method of example 47, wherein the first pedestrian data comprises a WeAllWalk data set.

49. The method of any of the examples 46-48, wherein:

the applying of the transformations comprises removing data, from the first pedestrian data, associated with the turn 804 comprising a 45 degree turn or 90 degree turns associated with a 45 degree turn; and the training comprises training the first machine learning module 1500 in the first stage, or another machine learning module, to detect, identify, or classify the turns 804 in the trajectory comprising 90 degree turns.

50. The method of any of the examples 46-49, wherein:

the applying the transformations comprises converting the first pedestrian data corresponding to the turns 804 comprising 90 degree turns into two consecutive 45 degree turns; and the training comprises training the first machine learning module or another machine learning module, to detect, identify, or classify the turns 804 comprising the 45 degree turns.

51. The method of any of the examples 46-50, further comprising:

creating a second training set 1302 from the modified set, the second training set comprising orientation turns 804 between adjacent ones of the straight sections 802;

training 1304A the first machine learning module in a second stage, or another machine learning module, to detect, classify, or identify the turns in the trajectory using the second training set, using the second training set.

52. The method of example 51, further comprising:

creating a third training set 1302 comprising ground truth turns obtained from a third database comprising ground truth data associated with the trajectory;

training 1304A the first machine learning module in a third stage, or the another machine learning module 1500 using the ground truth turns, to detect, identify, or classify the turns in the trajectory using the third training set.

53. FIG. 12 and FIG. 13 further illustrate a method comprising, or the method of any of the examples 46-52 further comprising, training a second machine learning module 1500 for detecting steps in the trajectory 800, comprising:

collecting 1200 a set of second pedestrian data comprising the acceleration of the pedestrian in three orthogonal directions and a rotation rate of the smartphone in the three orthogonal directions, wherein the acceleration is associated with steps taken by the pedestrian along the trajectory;

applying 1202 one or more second transformations to the second pedestrian data, comprising transforming coordinates of the second pedestrian data into a heading agnostic reference frame, to obtain heading agnostic data;

creating 1302 a second training set from the heading agnostic data, wherein steps are associated with:

impulses 100 identified using the acceleration data, the impulses corresponding to heel strikes 308 of the walking pedestrian 306, in the heading agnostic data; and a stride length 808 of the pedestrian 306; and training 1304B the second machine learning module 1500 using the second training set to at least identify or count a number of the steps in the trajectory by associating the steps with the impulses.

54. The method of example 53, further comprising:

creating a third training set 1302 comprising ground truth step data; and training the second machine learning module 1500 in a second stage to detect the steps 806 using the third training set.

55. FIG. 12 and FIG. 13 illustrate a method comprising, or the method of any of the examples 46-54 further comprising: training a third neural network module 1500 for mapping a trajectory, comprising:

collecting 1200 a set of third pedestrian data comprising the trajectory mapped using the first machine learning module 1500 and the second machine learning module 1500;

creating 1302 a third training set 1302 comprising ground truth data comprising waypoint time stamps; and training 1306 the third machine learning module to determine or map the trajectory by comparing a degree of alignment of the trajectory (mapped using the first neural network and the second neural network) with a ground truth path passing through the waypoint time stamps.

56. A computer implemented system 1000 of any of the preceding examples, comprising components stored in the memory that are executed by the processor comprising a map annotator (e.g., highlighted trajectory 801) that annotates the map and provides the instructions to a display 1022 component or speaker component of the mobile device to create or generate the highlighting or indicating of the trajectory; and a navigation component that extracts/receives data used by the map annotator to indicate the trajectory.

57. The computer implemented system or method of any of the preceding examples, comprising activating or utilizing a map updating the trajectory in real-time to provide navigation instructions in a real-world environment.

58. A navigation system or application or mapping system or odometer or application comprising the system of any of the examples 1-57.

59. The system or method of any of the examples, wherein ground truth data is data that is known to be real or true, provided by direct observation and measurement (i.e. empirical evidence) as opposed to information provided by inference.

60. FIG. 15 illustrates the system or method of any of the examples wherein the neural network 1500 (A) receives input data (e.g., training data comprising acceleration, azimuth angle from smartphone sensor) transformed into a format processable by the network via inputs X; (B) processes the input data using initialized variables (weights and biases and activation functions) in hidden layers, (C) outputs a predicted result (straight walking section, turn, step, trajectory); (D) compares the predicted result to an expected value (e.g., from training data) to produce an error; (E) propagates the error back through the same path and adjusts the variables (weights and biases) according to/in response the error (e.g., so as to reduce the magnitude of the error); (F) repeats steps (A)-(E) until the error is within an acceptable range; and (G) outputs one or more outputs comprising a prediction (straight walking section, turn, step, trajectory) made by applying these variables to a new unseen input data. Thus, in one or more embodiments, steps A-E can be repeated using the input data comprising training data and then used on new input data once the error is below a threshold value. In one or more examples, training sets are used to determine the weights, biases, and/or activation functions used to process the new input data using the neural network.

In various examples, the methods and systems described herein are integrated into a practical application (e.g., computer implemented mapping system or navigation system) and improve functioning of the mapping system, navigation system, and/or computers implementing the mapping or navigation system.

Embodiments of the systems described herein use the inertial sensors (accelerometer, gyro) of a regular smartphone to track the location of a pedestrian. Some embodiments may be particularly useful in indoor environments, where GPS cannot be used. In one or more examples, a system is designed to track the path of a pedestrian in two situations: when a map of the building is available, and it is not available.

The data and results presented herein were obtained using software developed using Xcode for iOS. The following iOS Frameworks were used: Foundation, AVFoundation, ULKit, CoreMotion, CoreML, GameplayKit, simd.—Charts https://github.com/danielgindi/Charts—Firebase https://firebase-.google.com—RoNIN https://github.com/Sachini/ronin—Python packages: numpy, pyproj, sklearn, pandas, tensorflow, h5py, quaternion, pytorch, onnx, spicy, keras, pathlib, matplotlib, pprint, tqdm, pylab, textwrap, pygame

Example Recurrent Neural Network

FIG. 15 illustrates an example recurrent neural network implementing machine learning modules according to embodiments described herein (e.g., examples 1-58 described above). The neural network 1500 (A) receives input data (e.g., acceleration, azimuth angle, orientation angles) transformed into a format processable by the network via inputs X; (B) processes the input data using initialized variables (weights and biases and activation functions) in hidden layers 1502; (C) outputs a predicted result; (D) compares the predicted result to an expected value to produce an error E; (E) propagates the error back through the same path and adjust the variables (weights and biases) according to/in response the error (e.g., so as to reduce the magnitude of the error; (F) repeats steps (A)-(E) until the error is within an acceptable range; and (G) outputs one or more outputs 1504 comprising a prediction made by applying these variables to a new unseen input data. Thus, in one or more embodiments, steps A-E can be repeated using the input data comprising training data (e.g., training sets as described in examples 46-55) and then used on new input data once the error E is below a threshold value. In one or more examples, training sets are used to determine the weights, biases, and/or activation functions used to process the new input data using the neural network 1500.

In one or more examples, the error E is determined using error metrics (e.g., the Loewenstein metric, comparison to ground truth data) or comparison to the error metrics, as described herein.

REFERENCES

The following references are incorporated by reference herein

1. Guerreiro, J.; Ahmetovic, D.; Sato, D.; Kitani, K.; Asakawa, C. Airport Accessibility and Navigation Assistance for People with Visual Impairments. In Proceedings of the 2019 CHI Conference on Human Factors in Computing Systems, Glasgow, Scotland, UK, 4-9 May 2019; pp. 1-14.
2. Murata, M.; Ahmetovic, D.; Sato, D.; Takagi, H.; Kitani, K. M.; Asakawa, C. Smartphone-Based Indoor Localization for Blind Navigation across Building Complexes. In Proceedings of the 2018 IEEE International Conference on Pervasive Computing and Communications (PerCom), Greece Athens, 19-23 Mar. 2018; pp. 1-10.
3. Spachos, P.; Plataniotis, K. N. BLE Beacons for Indoor Positioning at an Interactive IoT-Based Smart Museum. *IEEE Syst. J.* 2020, 14, 3483-3493.
4. Wang, S.-S. A BLE-Based Pedestrian Navigation System for Car Searching in Indoor Parking Garages. *Sensors* 2018, 18, 1442.
5. Kriz, P.; Maly, F.; Kozel, T. Improving Indoor Localization Using Bluetooth Low Energy Beacons. *Mob. Inf Syst.* 2016, 2016.
6. He, S.; Chan, S.-H. G. Wi-Fi Fingerprint-Based Indoor Positioning: Recent Advances and Comparisons. *IEEE Commun. Surv. Tutor.* 2015, 18, 466-490.
7. Scaramuzza, D.; Fraundorfer, F. Visual Odometry [Tutorial]. *IEEE Robot. Autom. Mag.* 2011, 18, 80-92.
8. Zhang, R.; Yang, H.; Hoflinger, F.; Reindl, L. M. Adaptive Zero Velocity Update Based on Velocity Classification for Pedestrian Tracking. *IEEE Sens. J.* 2017, 17, 2137-2145.
9. Thrun, S.; Burgard, W.; Fox, D. *Probabilistic Robotics*; Massachusetts Institute of Technology: Cambridge, MA, USA, 2005.
10. Yan, H.; Herath, S.; Furukawa, Y. RoNIN: Robust Neural Inertial Navigation in the Wild: Benchmark, Evaluations, and New Methods. arXiv arXiv:1905.12853 2019.
11. Yan, H.; Shan, Q.; Furukawa, Y. RIDI: Robust IMU Double Integration. In Proceedings of the European Conference on Computer Vision (ECCV), Munich, Germany, 8-14 Sep. 2018; pp. 621-636.
12. Chen, C.; Zhao, P.; Lu, C. X.; Wang, W.; Markham, A.; Trigoni, N. Oxiod: The Dataset for Deep Inertial Odometry. arXiv arXiv:1809.07491 2018.
13. Hallemans, A.; Ortibus, E.; Meire, F.; Aerts, P. Low Vision Affects Dynamic Stability of Gait. *Gait Posture* 2010, 32, 547-551.
14. Iosa, M.; Fusco, A.; Morone, G.; Paolucci, S. Effects of Visual Deprivation on Gait Dynamic Stability. *Sci. World J.* 2012, 2012.
15. Tomomitsu, M. S.; Alonso, A. C.; Morimoto, E.; Bobbio, T. G.; Greve, J. Static and Dynamic Postural Control in Low-Vision and Normal-Vision Adults. *Clinics* 2013, 68, 517-521.

16. Flores, G. H.; Manduchi, R. Weallwalk: An Annotated Dataset of Inertial Sensor Time Series from Blind Walkers. *ACM Trans. Access. Comput. (TACCESS)* 2018, 11, 1-28.

17. Jacobson, W. Orientation and mobility. In *Assistive Technology for Blindness and Low Vision*; CRC Press: Boca Raton, FL, USA, 2012.

18. Flores, G.; Manduchi, R. Easy Return: An App for Indoor Backtracking Assistance. In Proceedings of the 2018 CHI Conference on Human Factors in Computing Systems, Montreal, QC, Canada, 21-26 Apr. 2018; pp. 1-12.

19. Yoon, C.; Louie, R., Ryan, J.; Vu, M.; Bang, H.; Derksen, W.; Ruvolo, P. Leveraging Augmented Reality to Create Apps for People with Visual Disabilities: A Case Study in Indoor Navigation. In Proceedings of the 21st International ACM SIGACCESS Conference on Computers and Accessibility, Pittsburgh, PA, USA, 18-30 Oct. 2019; pp. 210-221.

20. Microsoft. Path Guide: Plug-and-Play Indoor Navigation. Available online: https://www.microsoft.com/en-us/research/project/path-guide-plug-play-indoor-navigation/ (accessed on 14 Nov. 2020).

21. Hsuan Tsai, C.; Peng, R.; Elyasi, F.; Manduchi, R. Finding Your Way Back: Comparing Path Odometry Algorithms for Assisted Return. In Proceedings of the 2021 IEEE International Conference on Pervasive Computing and Communications Workshops and Other Affiliated Events (PerCom Workshops), Kassel, Germany, 22-26 Mar. 2021.

22. Tian, Q.; Salcic, Z.; Kevin, I.; Wang, K.; Pan, Y. An Enhanced Pedestrian Dead Reckoning Approach for Pedestrian Tracking Using Smartphones. In Proceedings of the 2015 IEEE Tenth International Conference on Intelligent Sensors, Sensor Networks and Information Processing (ISSNIP), Singapore, 7-9 Apr. 2015; pp. 1-6.

23. Jin, Y.; Toh, H.-S.; Soh, W.-S.; Wong, W.-C. A Robust Dead-Reckoning Pedestrian Tracking System with Low Cost Sensors. In Proceedings of the 2011 IEEE International Conference on Pervasive Computing and Communications (PerCom), Seattle, WA, USA, 21-25 Mar. 2011; pp. 222-230.

24. Pai, D.; Sasi, I.; Mantripragada, P. S.; Malpani, M.; Aggarwal, N. Padati: A Robust Pedestrian Dead Reckoning System on Smartphones. In Proceedings of the 2012 IEEE 11th International Conference on Trust, Security and Privacy in Computing and Communications, Liverpool, UK, 25-27, June 2012; pp. 2000-2007.

25. Zhao, H.; Zhang, L.; Qiu, S.; Wang, Z.; Yang, N.; Xu, J. Pedestrian Dead Reckoning Using Pocket-Worn Smartphone. *IEEE Access* 2019, 7, 91063-91073.

26. Xiao, Z.; Wen, H.; Markham, A.; Trigoni, N. Robust Indoor Positioning with Lifelong Learning. *IEEE J. Sel. Areas Commun.* 2015, 33, 2287-2301.

27. Xiao, Z.; Wen, H.; Markham, A.; Trigoni, N. Robust Pedestrian Dead Reckoning (R-PDR) for Arbitrary Mobile Device Placement. In Proceedings of the 2014 International Conference on Indoor Positioning and Indoor Navigation (IPIN), Busan, Korea, 27-30 Oct. 2014; pp. 187-196.

28. Harle, R. A Survey of Indoor Inertial Positioning Systems for Pedestrians. *IEEE Commun. Surv. Tutor.* 2013, IS, 1281-1293.

29. Alzantot, M.; Youssef, M. UPTIME: Ubiquitous Pedestrian Tracking Using Mobile Phones. In Proceedings of the 2012 IEEE Wireless Communications and Networking Conference (WCNC), Paris, France, 1-4 Apr. 2012; pp. 3204-3209.

30. Jayalath, S.; Abhayasinghe, N.; Murray, I. A Gyroscope Based Accurate Pedometer Algorithm. In Proceedings of the International Conference on Indoor Positioning and Indoor Navigation, Montbeliard, France, 28-31 Oct. 2013; Volume 28, p. 31st.

31. Gu, F.; Khoshelham, K.; Shang, J.; Yu, F.; Wei, Z. Robust and Accurate Smartphone-Based Step Counting for Indoor Localization. *IEEE Sens. J.* 2017, 17, 3453-3460.

32. Edel, M.; Koppe, E. An Advanced Method for Pedestrian Dead Reckoning Using BLSTM-RNNs. In Proceedings of the 2015 International Conference on Indoor Positioning and Indoor Navigation (IPIN), Banff, AB, Canada, 13-16 Oct. 2015; pp. 1-6.

33. Kang, J.; Lee, J.; Eom, D.-S. Smartphone-Based Traveled Distance Estimation Using Individual Walking Patterns for Indoor Localization. *Sensors* 2018, 18, 3149.

34. Yoshida, T.; Nozaki, J., Urano, K.; Hiroi, K.; Kaji, K.; Yonezawa, T.; Kawaguchi, N. Sampling Rate Dependency in Pedestrian Walking Speed Estimation Using DualCNN-LSTM. In Proceedings of the Adjunct Proceedings of the 2019 ACM International Joint Conference on Pervasive and Ubiquitous Computing and Proceedings of the 2019 ACM International Symposium on Wearable Computers, 2019; pp. 862-868.

35. Solin, A.; Cortes, S.; Rahtu, E.; Kannala, J. Inertial Odometry on Handheld Smartphones. In Proceedings of the 2018 21st International Conference on Information Fusion (FUSION), Cambridge UK, 10-13 Jul. 2018; pp. 1-5.

36. Kok, M., Hol, J. D.; Schon, T. B. Using Inertial Sensors for Position and Orientation Estimation. arXiv arXiv: 1704.06053 2017.

37. Marron, J. J.; Labrador, M. A.; Menendez-Valle, A.; Fernandez-Lanvin, D.; Gonzalez-Rodriguez, M. Multi Sensor System for Pedestrian Tracking and Activity Recognition in Indoor Environments. *Int. J. Ad Hoc Ubiquitous Comput.* 2016, 23, 3-23.

38. Flores, G. H.; Manduchi, R.; Zenteno, E. D. *Ariadne's Thread: Robust Turn Detection for Path Back-Tracing Using the IPhone*; IEEE: 2014.

39. Roy, N.; Wang, H.; Roy Choudhury, R. I Am a Smartphone and i Can Tell My User's Walking Direction. In Proceedings of the Proceedings of the 12th Annual International Conference on Mobile Systems, Applications, and Services, Bretton Woods, NH, USA, 16-19 Jun. 2014; pp. 329-342.

40. Kunze, K.; Lukowicz, P.; Partridge, K.; Begole, B. Which Way Am I Facing: Inferring Horizontal Device Orientation from an Accelerometer Signal. In Proceedings of the 2009 International Symposium on Wearable Computers, NW Washington, DC, USA, 4-7 Sep. 2009; pp. 149-150.

41. Steinhoff, U.; Schiele, B. Dead Reckoning from the Pocket-an Experimental Study. In Proceedings of the 2010 IEEE international conference on pervasive computing and communications (PerCom), Mannheim, Germany, 29 Mar.-2 Apr. 2010; pp. 162-170.

42. Qian, J.; Ma, J.; Ying, R.; Liu, P.; Pei, L. An Improved Indoor Localization Method Using Smartphone Inertial Sensors. In Proceedings of the International Conference on Indoor Positioning and Indoor Navigation, Montbeliard, France, 28-31 Oct. 2013; pp. 1-7.

43. Brajdic, A.; Harle, R. Walk Detection and Step Counting on Unconstrained Smartphones. In Proceedings of the 2013 ACM international joint conference on Pervasive and ubiquitous computing, Zurich, Switzerland, 8-12 Sep. 2013; pp. 225-234.

44. Scholkmann, F.; Boss, J.; Wolf, M. An Efficient Algorithm for Automatic Peak Detection in Noisy Periodic and Quasi-Periodic Signals. *Algorithms* 2012, 5, 588-603.

45. Mannini, A.; Sabatini, A. M. A Hidden Markov Model-Based Technique for Gait Segmentation Using a Foot-Mounted Gyroscope. In Proceedings of the 2011 Annual International Conference of the IEEE Engineering in Medicine and Biology Society, Boston, MA, USA, 30 Aug.-3 Sep. 2011; pp. 4369-4373.

46. Yao, Y.; Pan, L.; Fen, W.; Xu, X.; Liang, X.; Xu, X. A Robust Step Detection and Stride Length Estimation for Pedestrian Dead Reckoning Using a Smartphone. *IEEE Sens. J.* 2020, 20, 9685-9697.

47. Ho, N.-H.; Truong, P. H.; Jeong, G.-M. Step-Detection and Adaptive Step-Length Estimation for Pedestrian Dead-Reckoning at Various Walking Speeds Using a Smartphone. *Sensors* 2016, 16, 1423.

48. Sun, Y.; Wu, H.; Schiller, J. A Step Length Estimation Model for Position Tracking. In Proceedings of the 2015 International Conference on Localization and GNSS (ICL-GNSS), Gothenburg, Sweden, 22-24 Jun. 2015; pp. 1-6.

49. Racko, J.; Brida, P.; Perttula, A.; Parviainen, J.; Collin, J. Pedestrian Dead Reckoning with Particle Filter for Handheld Smartphone. In Proceedings of the 2016 International Conference on Indoor Positioning and Indoor Navigation (IPIN), Alcala de Henares, Spain, 4-7 Oct. 2016; pp. 1-7.

50. Klepal, M.; Beauregard, S. A Novel Backtracking Particle Filter for Pattern Matching Indoor Localization. In Proceedings of the First ACM International Workshop on Mobile Entity Localization and Tracking in GPS-Less Environments, San Francisco, CA, USA, 19 Sep. 2008; pp. 79-84.

51. Leppakoski, H.; Collin, J.; Takala, J. Pedestrian Navigation Based on Inertial Sensors, Indoor Map, and WLAN Signals. *J. Signal Process. Syst.* 2013, 71, 287-296.

52. Bao, H.; Wong, W.-C. An Indoor Dead-Reckoning Algorithm with Map Matching. In Proceedings of the 2013 9th International Wireless Communications and Mobile Computing Conference (IWCMC), Sardinia, Italy, 1-5 Jul. 2013; pp. 1534-1539.

53. Chen, C.; Lu, X.; Markham, A.; Trigoni, N. Ionet. Learning to Cure the Curse of Drift in Inertial Odometry. In Proceedings of the AAAI Conference on Artificial Intelligence, New Orleans, LA, USA, 2-7 Feb. 2018; Volume 32.

54. Cortes, S.; Solin, A.; Kannala, J. Deep Learning Based Speed Estimation for Constraining Strapdown Inertial Navigation on Smartphones. In Proceedings of the 2018 IEEE 28th International Workshop on Machine Learning for Signal Processing (MLSP), Aalborg, Denmark, 17-20 Sep. 2018; pp. 1-6.

55. Feigl, T.; Kram, S.; Woller, P.; Siddiqui, R. H.; Philippsen, M.; Mutschler, C. RNN-Aided Human Velocity Estimation from a Single IMU. *Sensors* 2020, 20, 3656.

56. Jamil, F.; Iqbal, N.; Ahmad, S.; Kim, D.-H. Toward Accurate Position Estimation Using Learning to Prediction Algorithm in Indoor Navigation. *Sensors* 2020, 20, 4410.

57. Kawaguchi, N.; Nozaki, J.; Yoshida, T.; Hiroi, K.; Yonezawa, T.; Kaji, K. End-to-End Walking Speed Estimation Method for Smartphone PDR Using DualCNN- LSTM. In Proceedings of the IPIN (Short Papers/Work-in-Progress Papers), Pisa, Italy, 30 Sep.-3 Oct. 2019; pp. 463-470.

58. Wang, Q.; Luo, H.; Ye, L.; Men, A.; Zhao, F.; Huang, Y.; Ou, C. Personalized Stride-Length Estimation Based on Active Online Learning. *IEEE Internet Things J.* 2020, 7, 4885-4897.

59. Klein, I.; Asraf, O. StepNet-Deep Learning Approaches for Step Length Estimation. *IEEE Access* 2020, 8, 85706-85713.

60. Feigl, T.; Kram, S.; Woller, P.; Siddiqui, R. H.; Philippsen, M.; Mutschler, C. A Bidirectional LSTM for Estimating Dynamic Human Velocities from a Single IMU. In Proceedings of the 2019 International Conference on Indoor Positioning and Indoor Navigation (IPIN), Pisa, Italy, 30 Sep.-3 Oct. 2019; pp. 1-8.

61. Wagstaff, B.; Kelly, J. LSTM-Based Zero-Velocity Detection for Robust Inertial Navigation. In Proceedings of the 2018 International Conference on Indoor Positioning and Indoor Navigation (IPIN), Nantes, France, 24-27 Sep. 2018; pp. 1-8.

62. Kayukawa, S.; Ishihara, T.; Takagi, H.; Morishima, S.; Asakawa, C. Guiding Blind Pedestrians in Public Spaces by Understanding Walking Behavior of Nearby Pedestrians. In Proceedings of the ACM on Interactive, Mobile, Wearable and Ubiquitous Technologies, 2020; Volume 4, pp. 1-22.

63. Fusco, G.; Coughlan, J. M. Indoor Localization for Visually Impaired Travelers Using Computer Vision on a Smartphone. In Proceedings of the 17th International Web for All Conference, Taipei, Taiwan, 20-21 Apr. 2020; pp. 1-11.

64. Leung, T.-S.; Medioni, G. Visual Navigation Aid for the Blind in Dynamic Environments. In Proceedings of the IEEE Conference on Computer Vision and Pattern Recognition Workshops, Columbus, OH, USA, 23-28 Jun. 2014; pp. 565-572.

65. Ahmetovic, D.; Gleason, C.; Ruan, C.; Kitani, K.; Takagi, H.; Asakawa, C. NavCog: A Navigational Cognitive Assistant for the Blind. In Proceedings of the Proceedings of the 18th International Conference on Human-Computer Interaction with Mobile Devices and Services, Florence, Italy, 6-9 Sep. 2016; pp. 90-99.

66. Riehle, T. H.; Anderson, S. M.; Lichter, P. A.; Giudice, N. A.; Sheikh, S. I.; Knuesel, R. J.; Kollmann, D. T.; Hedin, D. S. Indoor Magnetic Navigation for the Blind. In Proceedings of the 2012 Annual International Conference of the IEEE Engineering in Medicine and Biology Society, San Diego, CA, USA, 28 Aug.-1 Sep. 2012; pp. 1972-1975.

67. Fallah, N.; Apostolopoulos, I.; Bekris, K.; Folmer, E. The User as a Sensor: Navigating Users with Visual Impairments in Indoor Spaces Using Tactile Landmarks. In Proceedings of the SIGCHI Conference on Human Factors in Computing Systems, Austin TX, USA, 5-10 May 2012; pp. 425-432.

68. Riehle, T. H.; Anderson, S. M.; Lichter, P. A.; Whalen, W. E.; Giudice, N. A. Indoor Inertial Waypoint Navigation for the Blind. In Proceedings of the 2013 35th Annual International Conference of the IEEE Engineering in Medicine and Biology Society (EMBC), Osaka, Japan, 3-7 Jul. 2013; pp. 5187-5190.

69. Wang, Q.; Ye, L.; Luo, H.; Men, A.; Zhao, F.; Huang, Y. Pedestrian Stride-Length Estimation Based on LSTM and Denoising Autoencoders. Sensors 2019, 19, 840.

70. Hochreiter, S.; Schmidhuber, J. Long Short-Term Memory. *Neural Comput.* 1997, 9, 1735-1780.

71. Chung, J.; Gulcehre, C.; Cho, K.; Bengio, Y. Empirical Evaluation of Gated Recurrent Neural Networks on Sequence Modeling. ArXiv arXiv:1412.3555 2014.

72. Paniit, S. M.; Zhang, W. Modeling Random Gyro Drift Rate by Data Dependent Systems. *IEEE Trans. Aerosp. Electron. Syst.* 1986, 455-460.

73. Chen, R.; Liu, J. S. Mixture Kalman Filters. 0.1. R. Stat. Soc. Ser. B (*Stat. Methodol.*) 2000, 62, 493-508.

74. Cheng, Y. Mean Shift, Mode Seeking, and Clustering. *IEEE Trans. Pattern Anal. Mach. Intell.* 1995, 17, 790-799.

75. Trinh, V.; Manduchi, R. Semantic Interior Mapology: A Toolbox for Indoor Scene Description from Architectural Floor Plans. In Proceedings of the 24th International Conference on 3D Web Technology, Los Angeles, CA, USA, 26-28 Jul. 2019; NIH Public Access; Volume 2019.

76. Horvat, M., Ray, C.; Ramsey, V. K.; Miszko, T.; Keeney, R., Blasch, B. B. Compensatory Analysis and Strategies for Balance in Individuals with Visual Impairments. *J. Vis. Impair. Blind.* 2003, 97, 695-703.

77. Koskimäki, H. Avoiding Bias in Classification Accuracy-a Case Study for Activity Recognition. In Proceedings of the 2015 IEEE Symposium Series on Computational Intelligence, Cape Town, South Africa, 7-10 Dec. 2015; pp. 301-306.

78. Sturm, J.; Engelhard, N.; Endres, F.; Burgard, W.; Cremers, D. A Benchmark for the Evaluation of RGB-D SLAM Systems. In Proceedings of the 2012 IEEE/RSJ International Conference on Intelligent Robots and Systems, Algarve, Portugal, 7-12 Oct. 2012; pp. 573-580.

79. Seyler, S. L.; Kumar, A.; Thorpe, M. F.; Beckstein, O. Path Similarity Analysis: A Method for Quantifying Macromolecular Pathways. *PLoS Comput. Biol.* 2015, 11, e1004568.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto

What is claimed is:

1. A navigation system determining turns in a user's trajectory, comprising:

a smartphone comprising a display and one or more sensors and at least comprising or coupled to one or more processors; one or more memories; and one or more programs stored in the one or more memories, wherein the one or more programs executed by the one or more processors carry out the following acts:

receiving input data, comprising orientation data and acceleration from the one or more sensors carried by a user taking steps along a trajectory;

detecting a plurality of n straight sections in the trajectory, where n is an integer, each of the straight sections corresponding to the user walking along a substantially straight or linear path;

generating and tracking an orientation of the user in each of the n straight sections, wherein the orientation comprises an estimated orientation taking into account drift of the input data outputted from the one or more sensors;

detecting one or more turns in the trajectory, wherein each of the turns is a change in the estimated orientation of the user in the $n^{th}$ one of the straight sections as compared to the estimated orientation in the $(n-1)^{th}$ one of the straight sections; and providing navigation instructions from the smartphone to the user using the trajectory generated using the one or more turns; and wherein detecting the straight sections further comprises the one or more programs:

storing the input data in a database;

transforming the input data into trajectory detection data processable by a first machine learning module;

classifying the trajectory detection data as representing motion in one of the straight sections or in a non-straight section using the first machine learning module; and labelling one or more values of the trajectory detection data as being associated with one of the straight sections if the one or more values are classified by the first machine learning module as being associated with the one of the straight sections.

2. The system of claim 1, wherein the first machine learning module is trained using training data comprising at least WeAllWalk™ data, or the acceleration and the orientation of pedestrians comprising blind or visually impaired persons walking using a walking aid.

3. The system of claim 1, wherein the first machine learning module comprises a GRU neural network.

4. The system of claim 1, wherein the first machine learning module comprises a recurrent neural network trained to identify, from the acceleration and the orientation data comprising an azimuthal angle, each of the straight sections comprising one or more time intervals during which the user walks regularly or substantially on a straight path.

5. The system of claim 1, wherein the first machine learning module is trained to disregard changes in the orientation resulting from the user comprising a visually impaired user stopping and rotating their body to re-orient or swerving to avoid a perceived obstacle.

6. The system of claim 1, further comprising detecting each of the straight sections after the one or more programs sample the orientation data for no more than 1 second.

7. The system of claim 1, wherein the turn by an angle of 90° is tracked as two consecutive turns by 45°.

8. The system of claim 1, wherein the trajectory is determined without reference to a map of an environment in which the user is moving.

9. The system of claim 1, wherein the one or more programs:

receive a map of an environment in which the user is moving, the map identifying one or more impenetrable walls, and determine the trajectory by comparing the trajectory to the map and eliminating one or more paths in the trajectory that traverse the one or more impenetrable walls.

10. The system of claim 9, wherein the one or more programs:

receive or obtain velocity vectors of the user from the input data or another source;

generate posterior locations of the user from the velocity vectors using a particle filtering module; and generate a mean shift estimating locations of the user corresponding to highest modes of the posterior locations to obtain estimated locations; and generate the trajectory by linking pairs of the estimated locations that share the largest number of the highest modes.

11. A navigation system determining turns in a user's trajectory, comprising:

a smartphone comprising a display and one or more sensors and at least comprising or coupled to one or more processors; one or more memories; and one or more programs stored in the one or more memories, wherein the one or more programs executed by the one or more processors carry out the following acts:

receiving input data, comprising orientation data and acceleration from the one or more sensors carried by a user taking steps along a trajectory;

detecting a plurality of n straight sections in the trajectory, where n is an integer, each of the straight sections corresponding to the user walking along a substantially straight or linear path;

generating and tracking an orientation of the user in each of the n straight sections, wherein the orientation comprises an estimated orientation taking into account drift of the input data outputted from the one or more sensors;

detecting one or more turns in the trajectory, wherein each of the turns is a change in the estimated orientation of the user in the $n^{th}$ one of the straight sections as compared to the estimated orientation in the $(n-1)^{th}$ one of the straight sections; and providing navigation instructions from the smartphone to the user using the trajectory generated using the one or more turns, wherein the one or more programs:

transform coordinates of the input data into a heading agnostic reference frame, to obtain heading agnostic data;

detect the steps as detected steps by associating impulses in the heading agnostic data with heel strikes using a machine learning module;

count a number of the detected steps by associating the steps with a stride length, so as to output step data;

determine the trajectory using the detected steps and the turns; and the trajectory comprises:

one or more step displacement vectors defined at each of the detected steps as having a first length equal to the stride length and a direction comprising an azimuthal angle obtained from the input data; and one or more turn displacement vectors defined as having a second length equal to the step length and with the direction determined from the turns detected.

12. The system of claim 11, further comprising the one or more programs:

transforming the heading agnostic data into trajectory detection data processable by the machine learning module; and at least classifying or recognizing one or more values of the trajectory detection data as being associated with the steps using the machine learning module, or counting the steps using the machine learning module.

13. The system of claim 12, wherein the machine learning module is trained using reference trajectory data outputted from another machine learning module identifying the user's trajectory.

14. The system of claim 12, wherein the machine learning module comprises an LSTM neural network comprising no more than 2 layers and a hidden unit size of no more than 6.

15. A method for determining turns in a user's trajectory, comprising, using a smart phone comprising a display and one or more sensors and at least comprising or coupled to a computer comprising one or more processors; one or more memories; and one or more programs stored in the one or more memories:

capturing input data, comprising orientation data and acceleration data from the one or more sensors in the smartphone carried by a user taking steps along a trajectory;

detecting a plurality of n straight sections in the trajectory, each of the straight sections corresponding to the user walking along a substantially straight path or a linear path;

generating and tracking an orientation of the user in each of the n straight sections, wherein the orientation comprises an estimated orientation taking into account drift of the input data outputted from the one or more sensors; and detecting one or more turns in the trajectory, wherein each of the turns is a change in the estimated orientation of the user in the $n^{th}$ one of the straight sections as compared to the estimated orientation in the $(n-1)^{th}$ one of the straight sections;

storing the input data in a database on the computer;

transforming the input data into trajectory detection data processable by a first machine learning module;

classifying the trajectory detection data as representing motion in one of the straight sections or in a non-straight section using the first machine learning module;

labelling one or more values of the trajectory detection data as being associated with one of the straight sections if the one or more values are classified by the first machine learning module as being associated with the one of the straight sections; and providing navigation instructions from the smartphone to the user using the trajectory generated from the one or more turns.

16. The method of claim 15, further comprising training the first machine learning module for detecting at least one of the straight sections or the turns in the trajectory, comprising:

collecting a set of first pedestrian data, the first pedestrian data comprising the orientation data and the acceleration data for one or more walking pedestrians;

applying one or more transformations to the first pedestrian data including smoothing to create a modified set of pedestrian data;

creating a first training set from the modified set, comprising labelled straight walking sections and labeled non-straight walking sections; and training the first machine learning module using the first training set to identify the straight sections in the trajectory detection data using the orientation data and the acceleration data, the straight sections each corresponding to the user walking along the linear path.

17. The method of claim 16, wherein the first training set comprises the modified set comprising data for the walking pedestrians comprising blind or visually impaired persons walking using a walking aid comprising at least one of a cane or a guide dog.

18. The method of claim 17, wherein the first pedestrian data comprises a WeAllWalk™ data set.

19. The method of claim 16, wherein:

the applying of the transformations comprises removing data, from the first pedestrian data, associated with a single 45° turn or 90° turns associated with a 45° turn; and the training comprises training the first machine learning module, or another machine learning module, to detect, identify, or classify the turns in the trajectory comprising 90° turns.

20. The method of claim 16, further comprising:

creating a second training set from the modified set, the second training set comprising orientation turns between adjacent ones of the straight sections;

training the first machine learning module, or another machine learning module, to detect, classify, or identify the turns in the trajectory using the second training set.

\* \* \* \* \*